(12) United States Patent
Partheepan

(10) Patent No.: US 11,629,855 B2
(45) Date of Patent: Apr. 18, 2023

(54) REDESIGNED BURNER

(71) Applicant: Tascosa Advanced Services, Inc., San Antonio, TX (US)

(72) Inventor: Joshua Partheepan, Canyon, TX (US)

(73) Assignee: Tascosa Advanced Services, Inc., Amarillo, TX (US)

( * ) Notice: Subject to any disclaimer, the term of this patent is extended or adjusted under 35 U.S.C. 154(b) by 711 days.

(21) Appl. No.: 16/489,882

(22) PCT Filed: Aug. 2, 2018

(86) PCT No.: PCT/US2018/045065
§ 371 (c)(1),
(2) Date: Aug. 29, 2019

(87) PCT Pub. No.: WO2019/028289
PCT Pub. Date: Feb. 7, 2019

(65) Prior Publication Data
US 2020/0072458 A1    Mar. 5, 2020

Related U.S. Application Data

(60) Provisional application No. 62/540,348, filed on Aug. 2, 2017.

(51) Int. Cl.
| | |
|---|---|
| *F22B 1/00* | (2006.01) |
| *F01K 25/00* | (2006.01) |
| *F22G 1/12* | (2006.01) |
| *F23D 14/28* | (2006.01) |
| *F23D 14/82* | (2006.01) |

(Continued)

(52) U.S. Cl.
CPC ............ *F22B 1/003* (2013.01); *F01K 25/005* (2013.01); *F22G 1/12* (2013.01); *F23D 14/28* (2013.01); *F23D 14/82* (2013.01); *F23K 5/007* (2013.01); *F23K 5/142* (2013.01); *F23K 5/22* (2013.01); *F23L 7/002* (2013.01); *F23L 7/005* (2013.01); *F23L 7/007* (2013.01); *F23N 1/10* (2013.01); *F23D 2214/00* (2013.01); *F23K 2203/002* (2013.01); *F23K 2400/201* (2020.05); *F23N 2239/04* (2020.01)

(58) Field of Classification Search
None
See application file for complete search history.

(56) References Cited

U.S. PATENT DOCUMENTS

| | | |
|---|---|---|
| 3,459,953 A | 8/1969 | Hughes |
| 4,074,708 A | 2/1978 | Hochmuth |

(Continued)

*Primary Examiner* — Jason Lau
(74) *Attorney, Agent, or Firm* — Shannon Warren

(57) ABSTRACT

A steam generator system configured to burn hydrogen and oxygen at stoichiometry along with a increased-pressure water and steam. Said steam generator system comprise a hydrogen source, an oxygen source, a nitrogen source, a water source, a steam source, a hydrogen-oxygen handling unit, a cooling unit, a one or more H2-O2 steam generators and a control unit. Said steam generator system is configured to provide said hydrogen source to said hydrogen-oxygen handling unit through an oxygen passage, said oxygen source to said hydrogen-oxygen handling unit through a hydrogen passage, and said nitrogen source to selectively purge said oxygen passage and said hydrogen passage. Said water source provide water to said cooling unit. Said cooling unit is configured to receive said water source and said steam source.

32 Claims, 9 Drawing Sheets

(51) Int. Cl.
  *F23K 5/00* (2006.01)
  *F23K 5/14* (2006.01)
  *F23K 5/22* (2006.01)
  *F23L 7/00* (2006.01)
  *F23N 1/10* (2006.01)

(56) References Cited

U.S. PATENT DOCUMENTS

| | | |
|---|---|---|
| 4,148,185 A | 4/1979 | Somers |
| 4,474,140 A | 10/1984 | Sternfeld |
| 6,206,684 B1 | 3/2001 | Mueggenburg |
| 6,832,622 B2 | 12/2004 | Hassel |
| 2005/0072381 A1 | 4/2005 | Requadt |
| 2008/0083537 A1 | 4/2008 | Klassen et al. |

REDESIGNED BURNER

CROSS-REFERENCE TO RELATED APPLICATIONS

This application claims benefit to U.S. Patent Application No.(s) 62/540,348 filed on Aug. 2, 2017, U.S. Pat. No. 16,013,880 filed Jun. 20, 2018, U.S. Pat. No. 14,763,467 filed Jul. 24, 2015. It is the national stage filing of PCT application PCT/US18/45065 filed Aug. 2, 2018, which in turn claims U.S. Patent Application No.(s) 62/540,348 filed on Aug. 2, 2017 for priority.

It is noted that the international search report for all 35 claims in this application was returned as 1-35 yes for allowable, 1-35 yes for inventive step, and 1-35 yes for industrial applicability.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

The premixed H2-O2 combustor for steam generation includes an H2-O2 handling unit, a cooling unit, and an H2-O2 steam generator. The H2-O2 handling unit receives the fuel and oxidizer and safely premixes it at the stoichiometry ratio. The cooling unit separately receives the cooling steam and cooling water. Depending on operational requirements, it regulates separate output flows of steam and water or a mixture of steam and water. The part of the system referred to as the "H2-O2 steam generator" consists of a burner tip for the premixed H2-O2 and the steam generation chamber. The burner tip receives the premixed H2-O2 from the H2-O2 handling unit and a portion of cooling fluids from the cooling unit and injects them into the steam generation chamber where the mixture is combusted. The combustion resultants are further mixed with the cooling fluids to generate steam at the desired temperature and pressure. The system generates steam with minimal residual from combustion and is free from harmful, polluting greenhouse gases. This steam can be used in power generation, in locomotives for propulsion, and in combined heat and power generation.

The present invention relates to a system for burning hydrogen (H2) and oxygen (O2) to provide power or propulsion. In particular, the present invention is directed to a system that can operate in a fully premixed mode at stoichiometry to produce steam. In specific embodiments, the invention allows for operation at high-pressure and different flowrates without flashback problems, with the additional benefit of zero toxic pollutants from combustion sources.

Hydrogen has been known for its combustible nature since 1650, when it was described as "inflammable air." Hydrogen as a fuel is significantly different from all other commonly-used hydrocarbon liquid and gas fuels. Hydrogen is extremely flammable and often described as the most flammable of all known substances.

H2-O2 combustion produces a high-temperature flame which results in steam and unburnt gasses as the combustion product. Industrial processes predominantly use pure H2 and O2 for combustion. These processes are categorized as either "premixed" or "non-premixed (post-mixed). Premixed H2-O2 is used in small-scale applications such as limelight, oxyhydrogen blowpipes, and oxyhydrogen torches for cutting and welding. Non-premixed H2-O2 is used in combustion chambers, steam generators, internal-combustion engines, rocket engines, and other industrial and environmental applications.

A device which burns H2-O2 at stoichiometry for steam generation, described as an "aphodid burner," was patented in 1967 by Oklahoma State University. Several papers were written about it in the early 1970s. The German Aerospace Center (DLR) and the Institute of Combustion Aerothermics Reactivity and Environment (ICARE) in France collaborated to study several configurations of hydrogen-oxygen combustion-based steam generators for power generation. These used several different configurations of water injection into the steam generators. The DLR and ICARE have also collaborated to design and patent a steam generator for sterilization purposes in the pharmaceutical industry. All of these designs use non-premixed H2-O2 combustion.

There are some premixed combustion chamber designs which use "multi-fuel" (either multiple, different fuels, or a combination of different fuels) with pure oxygen at stoichiometric. However, the combustion results in some greenhouse gasses which need to be captured and either stored or processed safely.

Several configurations of hydrogen-oxygen combustion-based steam generators for power generation known in the prior art is based on the premixed combustion strategy have been designed and patented. These steam generators were devised to be used in steam turbine cycles for power generation. The prior art steam generators are highly efficient; however, a small proportion of unburnt gasses are present in the steam stream. This poses a significant risk when used in steam turbines, as it can cause corrosion and erosion problems. Hydrogen has several unique characteristics related to combustion: wide range of flammability, low ignition energy, small quenching distance, high flame speed and high diffusivity, all of which makes premixed combustion too risky due to the danger of flashbacks and explosions.

The present invention provides premixed hydrogen-oxygen combustion-based steam generators with appropriate gas handling equipment which is capable of reducing the unburnt gases, and eliminating the flashback and explosion problems without thermal meltdown of the combustion chamber. The system can be configured for both conventional steam turbine and steam injected gas turbine operation. Thus, the present invention overcomes the above-mentioned disadvantages and drawbacks of previous designs.

The system consists of an H2-O2 handling unit, a cooling unit, and an H2-O2 steam generator. Further the H2-O2 handling unit can consist of H2 and O2 source which delivers H2 and O2 respectively, mass flow controllers for H2 and O2, flash-back/flame arrestors for H2 and O2 and H2-O2 mixer. The cooling unit can consist of sources for both water and high-pressure, low-temperature ("HP-LT") steam, flow controllers for water and steam, a high-pressure water pump, and a steam-water mixer. The part of the system referred to as the "H2-O2 steam generator" consists of a burner tip for the premixed H2-O2 and the steam generation chamber.

Designs for H2-O2 combustion for steam generation and their uses are disclosed in U.S. Pat. Nos. 3,459,953, 4,148,185, 6,206,684B1 and 4,474,140. However, the current patent application presents a different and unique design.

The international search report cites this prior art, but does not conclude that any render the current claims ineligible for patent protection: U.S. Pat. No. 6,832,622B2, US 2008/0083537A1, U.S. Pat. Nos. 4,148,185A, 4,074,708A, and US2005/0072381A1.

None of the known inventions and patents, taken either singularly or in combination, is seen to describe the instant disclosure as claimed.

BRIEF SUMMARY OF THE INVENTION

A steam generator system configured to burn hydrogen and oxygen at stoichiometry along with a high-pressure water and steam. Said steam generator system comprise a hydrogen source, an oxygen source, a nitrogen source, a water source, a steam source, a hydrogen-oxygen handling unit, a cooling unit, a one or more H2-O2 steam generators and a control unit. Said steam generator system is configured to provide said hydrogen source to said hydrogen-oxygen handling unit through an oxygen passage, said oxygen source to said hydrogen-oxygen handling unit through a hydrogen passage, and said nitrogen source to selectively purge said oxygen passage and said hydrogen passage. Said water source provide water to said cooling unit. Said cooling unit is configured to receive said water source and said steam source. Said hydrogen-oxygen handling unit is configured to blend portions of said hydrogen source and said oxygen source into a premixed H2-O2, and to selectively send portions of said premixed H2-O2 to said one or more H2-O2 steam generators. Said cooling unit is configured to receive and process said water source and said steam source into a cooling steam and said high-pressure water, and to selectively send said cooling steam and said high-pressure water to said one or more H2-O2 steam generators. Said premixed H2-O2 is at stoichiometry. Said one or more H2-O2 steam generators is configured to burn said premixed H2-O2, and to cool said one or more H2-O2 steam generators with said cooling steam and said high-pressure water and thereby to generate a generated steam. Said control unit receives input signals and data from various components of said steam generator system, processes it, and controls various instruments in the system.

A method of burning H2-O2 for creating a generated steam comprising the following steps. Receiving a hydrogen from a hydrogen source into a hydrogen-oxygen handling unit having a hydrogen mass flow controller, a H2 flame/flash back arrestor, an oxygen mass flow controller, an oxygen flame flash back arrestor and a H2-O2 mixer. Monitoring said hydrogen from said hydrogen source with said hydrogen mass flow controller for flow rate, temperature and pressure. Controlling desired flow rate of said hydrogen coming from said hydrogen source with said hydrogen mass flow controller of said hydrogen-oxygen handling unit. Further a hydrogen flame flash back arrestor is a safety device, helps in quenches the flame during a flame/flash-back occurrence in the hydrogen passage and preventing it from reaching said hydrogen source. From said H2 flame/flash back arrestor, said hydrogen is feed into said H2-O2 mixer. Receiving an oxygen source into said hydrogen-oxygen handling unit. Monitoring said oxygen from said oxygen source with said oxygen mass flow controller for flow rate, temperature and pressure. Controlling desired flow rate of said oxygen coming from said oxygen source with said oxygen mass flow controller of said hydrogen-oxygen handling unit. Further said oxygen flame flash back arrestor is a safety device, helps in quenches the flame during a flame/flash-back occurrence in the oxygen passage and preventing it from reaching said oxygen source. From said oxygen flame flash back arrestor, said oxygen is feed into said H2-O2 mixer. Said H2-O2 mixer, receives said hydrogen from said H2 flame/flash back arrestor and said oxygen from said oxygen flame flash back arrestor and mixes in a stoichiometric ratio and feeds it into a premixed H2-O2 inlet of a burner tip. Before and after operation of a steam generator system, nitrogen from a nitrogen source is used to purge said hydrogen passage and said oxygen passage to ensure safe operation and prevent flame/flash back.

BRIEF DESCRIPTION OF THE SEVERAL VIEWS OF THE DRAWING

FIG. 6A illustrates block diagram view of a water only configuration 600a.

DETAILED DESCRIPTION OF THE INVENTION

Figure 1:
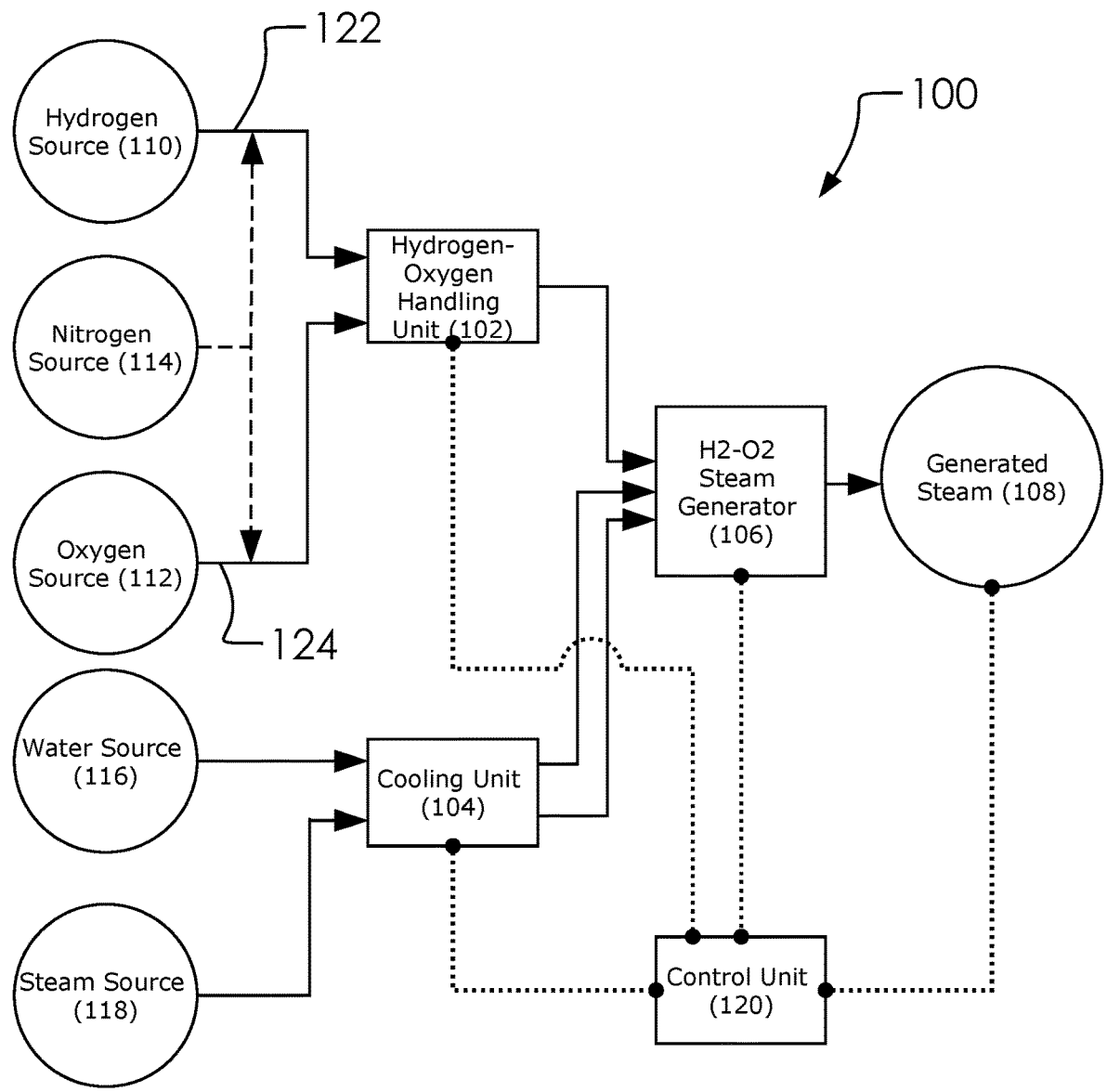
FIG. 1 illustrates as a simplified block diagram view of a steam generator system 100.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

These parts are illustrated in the figures and discussed below: a steam generator system 100, a hydrogen-oxygen handling unit 102, a cooling unit 104, a one or more H2-O2 steam generators 106, a generated steam 108, a hydrogen source 110, an oxygen source 112, a nitrogen source 114, a water source 116, a steam source 118, a control unit 120, an oxygen passage 122, a hydrogen passage 124, a hydrogen mass flow controller 202, a hydrogen flame flash back arrestor 204, an oxygen mass flow controller 206, an oxygen flame flash back arrestor 208, a H2-O2 mixer 210, a water flow controller 212, a high-pressure water pump 214, a steam flow controller 216, a steam-water mixer 218, a cooling steam 220, a HP-LT steam 222, a steam-water mist mixture 224, a premixed H2-O2 226, a high-pressure water 228, a burner tip main body 300, a one or more cooling steam inlets 302, a first cooling steam inlet 302a, a second cooling steam inlet 302b, a premixed H2-O2 inlet 304, an insulating medium 306, a premixed H2-O2 receiving chamber 308, a sintered plate 310, a premixed H2-O2 upper chamber 312, a one or more cooling steam chambers 314, a first cooling steam chamber 314a, a second cooling steam chamber 314b, a premixed H2-O2 injector array 316, a one or more steam injectors 318, a first steam injector 318a, a second steam injector 318b, a flow velocity equalizer medium 320, a burner tip 350, a burner tip mounting frame 500, a liner 502, an inner pass 504, an outer pass 506, a cooling steam inlet 508, a steam injector ring 510, a cooling water inlet 512, a water spray nozzle 514, a liner steam vent 516, a steam exit vent 518, a length 520, a width 522, an ignition unit 524, a front end 526, a rear end 528, a steam generation chamber 550, a water only configuration 600a, a steam only configuration 600b, an alternative configuration 700, a hydrogen pump 702, an oxygen pump 704, an alternative cooling unit 800, a method of burning H2-O2 900, a receiving H2 and O2 step 902, a controlling H2 and O2 step 904, a mixing H2 and O2 step 906, a burning premixed H2-O2 step 908, a generating cooling steam step 910, and a cooling steam generator step 912.

FIG. 1 illustrates as a simplified block diagram view of a steam generator system 100.

In one embodiment, said steam generator system 100 can comprise said hydrogen-oxygen handling unit 102, said cooling unit 104, said steam generator 106, said burner tip 350, said steam generation chamber 550, said generated steam 108, said hydrogen source 110, said oxygen source 112, said nitrogen source 114, said water source 116, said steam source 118 and said control unit 120.

In one embodiment, said steam generator 106 can comprise said burner tip 350 and said steam generation chamber 550.

FIGS. 1-2C represent simplified block diagrams of said steam generator system 100.

In one embodiment, said steam generator system 100 can comprise said hydrogen source 110, said nitrogen source 114, said oxygen source 112, said water source 116, said steam source 118, said hydrogen-oxygen handling unit 102, said cooling unit 104, said steam generator 106, said generated steam 108, and said control unit 120. In one embodiment, said hydrogen source 110 can comprise H2, said nitrogen source 114 can comprise N2, and said oxygen source 112 can comprise O2.

Said hydrogen-oxygen handling unit 102 can comprise a hydrogen/oxygen ("H2-O2") handling unit. Said steam generator 106 can comprise an H2-O2 steam generator. Said water source 116 can be demineralized. Said steam source 118 can comprise steam at "high-pressure, low temperature" as discussed below.

In one embodiment, said hydrogen source 110 can be hydrogen in gaseous phase stored under pressure in gas cylinders, or containers, or hydrogen stored in large scale in geological storage or hydrogen stored in indirect form for example metal hydrides, or hydrogen from industrial process or hydrogen stored in liquid phase. The hydrogen purity can be of industrial grade; however, some impurities can be accommodated, depending on the final temperature, pressure, and usage of the steam generated by said steam generator system 100.

In one embodiment, said oxygen source 112 can be oxygen in gaseous phase stored under pressure in gas cylinders, containers, oxygen stored in large scale in geological storage, oxygen from industrial processes, or oxygen stored in liquid phase. The oxygen purity can be of industrial grade; however, some impurities can be accommodated, depending on the final temperature, pressure and usage of the steam generated by said steam generator system 100.

In one embodiment, said nitrogen source 114 can be nitrogen in gaseous phase stored under pressure in gas cylinders or containers. Said nitrogen source 114 provides nitrogen under pressure to purge the hydrogen and oxygen lines before and after operation of said steam generator system 100. Said nitrogen source 114 can also be replaced with a variety of inert gases, as is known in the art.

A discussion of monitoring and regulating a pressure of said hydrogen source 110 and said oxygen source 112 with pumps is included below and illustrated in FIG. 7.

In one embodiment, said water source 116 can comprise demineralized water with additives in accordance with industrial standards or requirement for steam generation. In one embodiment, an additive can be used to minimize rust and harm to said steam generator system 100 due to the demineralized water.

In one embodiment, said steam source 118 can comprise steam at "High-Pressure, Low-Temperature" ("HP-LT") characteristics. Wherein, said steam source 118 can provide steam for cooling purposes in said steam generator 106.

Depending on the application of said steam generator system 100, availability of resources, and economic factors, said steam generator system 100 can comprise only said water source 116, only said steam source 118, or a combination of said water source 116 and said steam source 118.

In one embodiment, said generated steam 108 can comprise a steam at "high-pressure, high-temperature" ("HP/HT" or "HP-HT"). Said generated steam 108 can be generated by said steam generator 106 at a desired temperature, pressure and mass flow rate. Sensors can be used to measure the temperature, pressure and flow rate of said generated steam 108.

In one embodiment, said control unit 120 can receive signals from different sensors, measuring devices and instruments used in said steam generator system 100. In one embodiment, said control unit 120 can process these signals along with external inputs from human or other control units and can send command signals to different instruments and control modules present in said steam generator system 100 to efficiently and accurately carry out the steam generation process. Said control unit 120 can also send and receive signals from said hydrogen-oxygen handling unit 102 and said cooling unit 104 and receive signals from said generated steam 108.

Figure 2A:
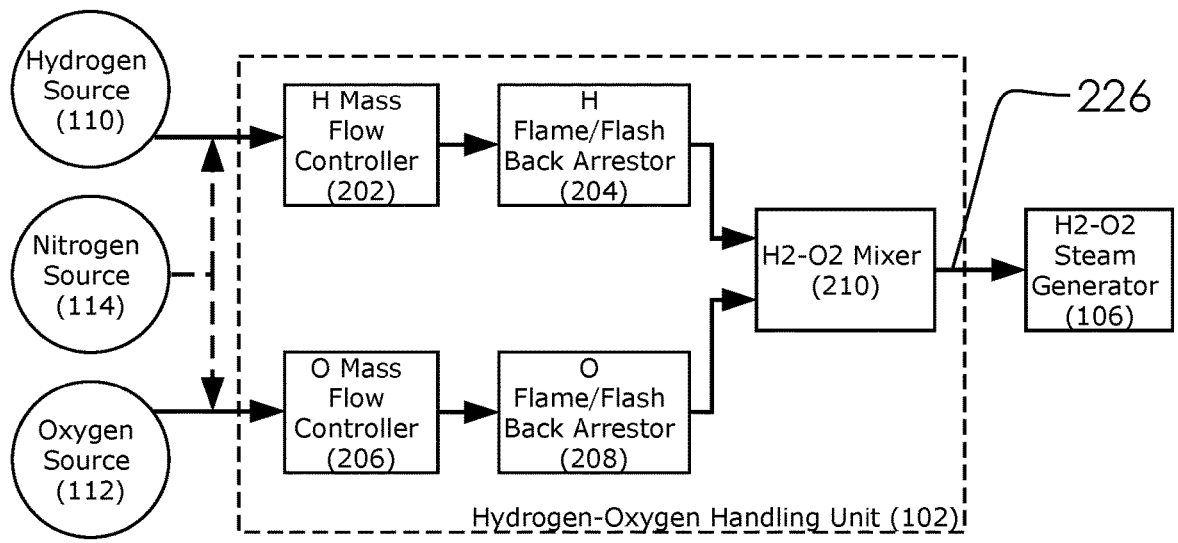
FIG. 2A illustrates simplified block diagram view of a hydrogen-oxygen handling unit 102.

FIG. 2A illustrates simplified block diagram view of a hydrogen-oxygen handling unit 102.

Figure 2B:
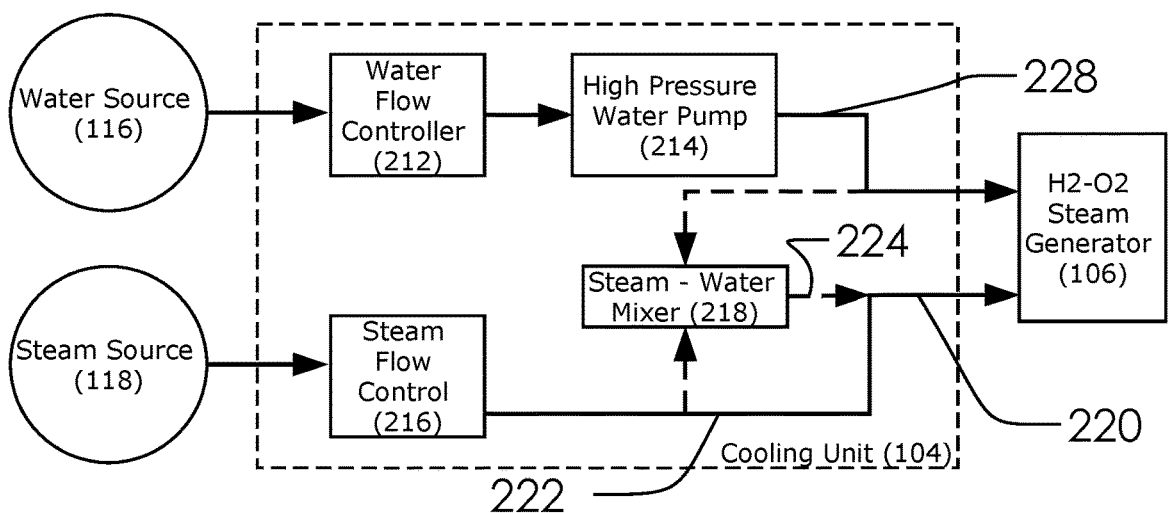
FIG. 2B illustrates simplified block diagram view of a cooling unit 104.

FIG. 2B illustrates simplified block diagram view of a cooling unit 104.

In one embodiment, said steam generator system 100 can comprise said cooling steam 220 and said high-pressure water 228.

In one embodiment, said hydrogen-oxygen handling unit 102 can comprise said hydrogen mass flow controller 202, said hydrogen flame flash back arrestor 204, said oxygen mass flow controller 206, said oxygen flame flash back arrestor 208, said H2-O2 mixer 210 and said premixed H2-O2 226.

In one embodiment, said cooling unit 104 can comprise said water flow controller 212, said high-pressure water pump 214, said steam flow controller 216, said steam-water mixer 218, said HP-LT steam 222, said steam-mist mixture 224, said high-pressure water 228 and said high-pressure water 228.

In one embodiment, said hydrogen-oxygen handling unit 102 can comprise a hydrogen/oxygen (H2-O2) handling unit.

In one embodiment, said hydrogen mass flow controller 202 regulates the mass flow of gaseous hydrogen from said hydrogen source 110. In one embodiment, said hydrogen source 110 can comprise a gaseous hydrogen. In one embodiment, said hydrogen mass flow controller 202 can measure the temperature and pressure of said hydrogen source 110 flowing through it.

In one embodiment, said oxygen mass flow controller 206 regulates the mass flow of gaseous oxygen from said oxygen source 112. Said oxygen mass flow controller 206 can also measure the temperature and pressure of said oxygen source 112 flowing through it.

In one embodiment, said hydrogen source 110 comprises a liquid hydrogen; wherein, said hydrogen source 110 can be converted into gaseous hydrogen before feeding into said hydrogen mass flow controller 202. Likewise, said oxygen source 112 can comprise liquid oxygen; wherein, said oxygen source 112 can be converted into gaseous oxygen before feeding into said oxygen mass flow controller 206.

In one embodiment, said hydrogen flame flash back arrestor 204 helps in arresting the flame or flash back in the hydrogen carrying conduit and prevents the flame/flash back from entering said hydrogen source 110. Said hydrogen flame flash back arrestor 204 can also act as a reverse flow check valve.

Likewise, said oxygen flame flash back arrestor 208 helps in arresting the flame or flash back in the oxygen-carrying conduit and prevents the flame/flash back from entering said oxygen source 112. Said oxygen flame flash back arrestor 208 can also act as a reverse-flow check valve.

In one embodiment, said H2-O2 mixer 210 can receive hydrogen and oxygen and mix them uniformly to form a stoichiometric ratio of hydrogen and oxygen. Said stoichiometric ratio can comprise 1 Kg of H2 to 8 Kg of O2. Said hydrogen mass flow controller 202 and said oxygen mass flow controller 206 precisely control the mass flow of hydrogen and oxygen entering said H2-O2 mixer 210 to form a premixed H2-O2 226, where said premixed H2-O2 226 is at stoichiometric ratio.

In one embodiment, said water flow controller 212 regulates the flow of fluid from said water source 116. Said water flow controller 212 can also measure the temperature of said water source 116 flowing through it.

In one embodiment, said steam flow controller 216 regulates the flow of said steam source 118. Said steam flow controller 216 can also measure the temperature and pressure of said steam source 118 flowing through it.

In one embodiment, said high-pressure water pump 214 pumps said water source 116 to an increased-pressure water 228. In one embodiment, said increased-pressure water 228 can comprise approximately 2000 psi. In one embodiment, said increased-pressure water 228 can be directed to said steam generator 106 and/or to said steam-water mixer 218.

Figure 6A:
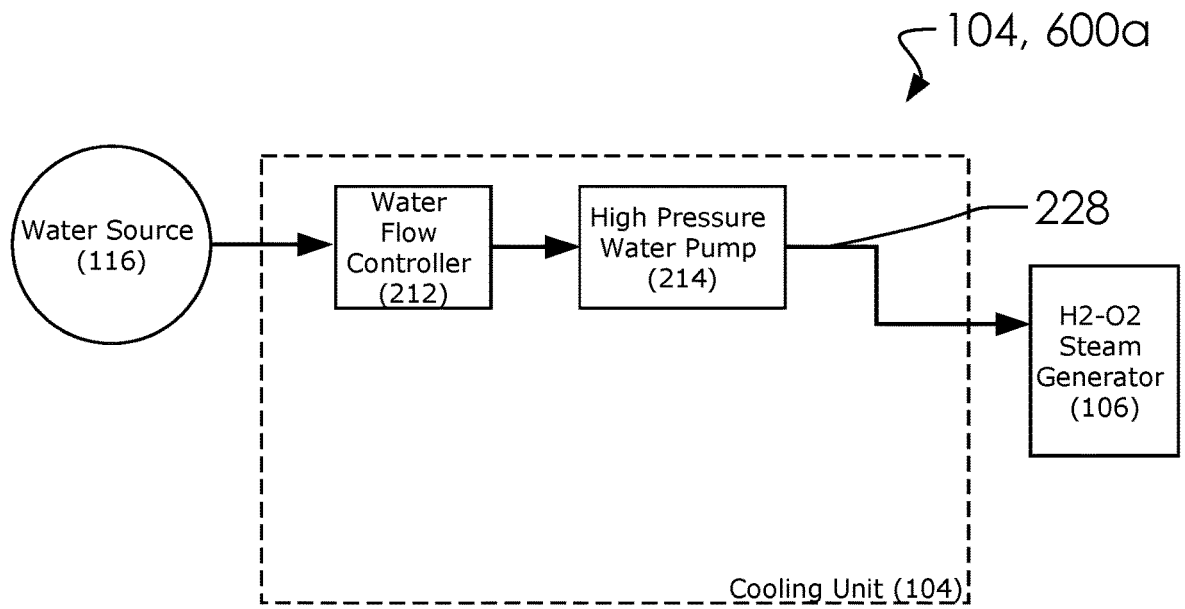
Figure 6B:
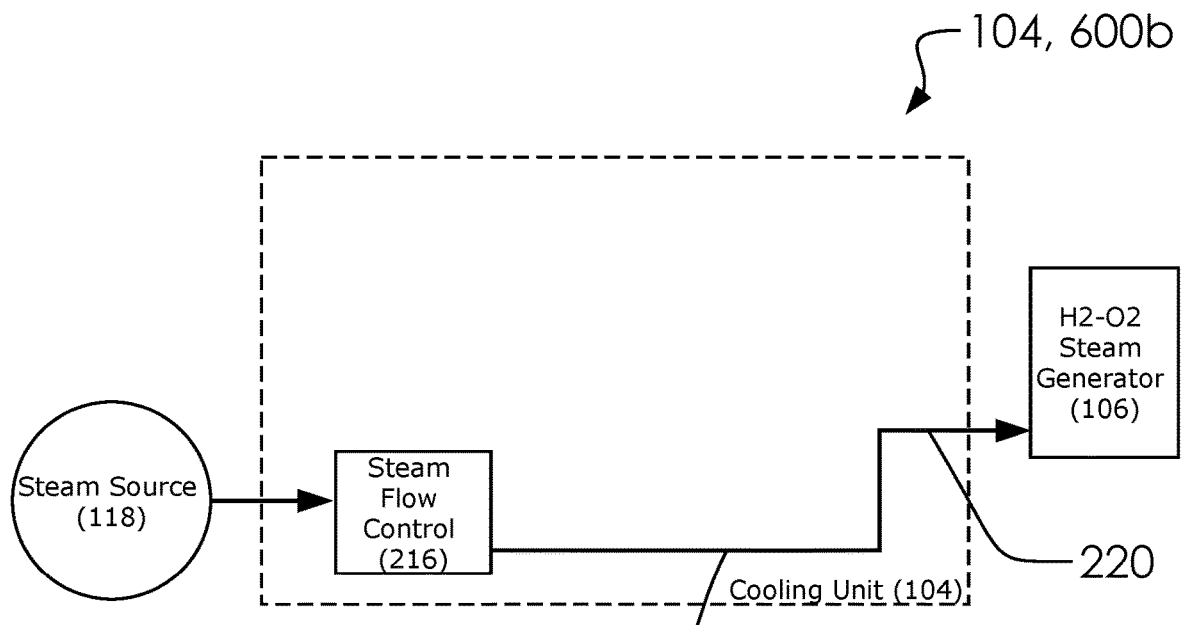
FIG. 6B illustrates block diagram view of a steam only configuration 600b.

As discussed and illustrated a FIGS. 6A-6B, said steam generator system 100 can comprise either said water source 116 or said steam source 118 as inputs. However, as discussed here, said steam generator system 100 can comprise both said water source 116 and said steam source 118. In such case, both said increased-pressure water 228 and steam source 118 can be used in said steam generator 106 for temperature regulating purposes.

In one embodiment, a portion of said increased-pressure water 228 and a portion of said steam source 118 can enter said steam-water mixer 218, said steam-water mixer 218 can direct said increased-pressure water 228 to be sprayed into said cooling steam 220 as said steam-mist mixture 224 by using a high-pressure spray nozzle (or nozzles); wherein, said steam-mist mixture 224 can be carried by said cooling steam 220 into said steam generator 106.

Figure 3:
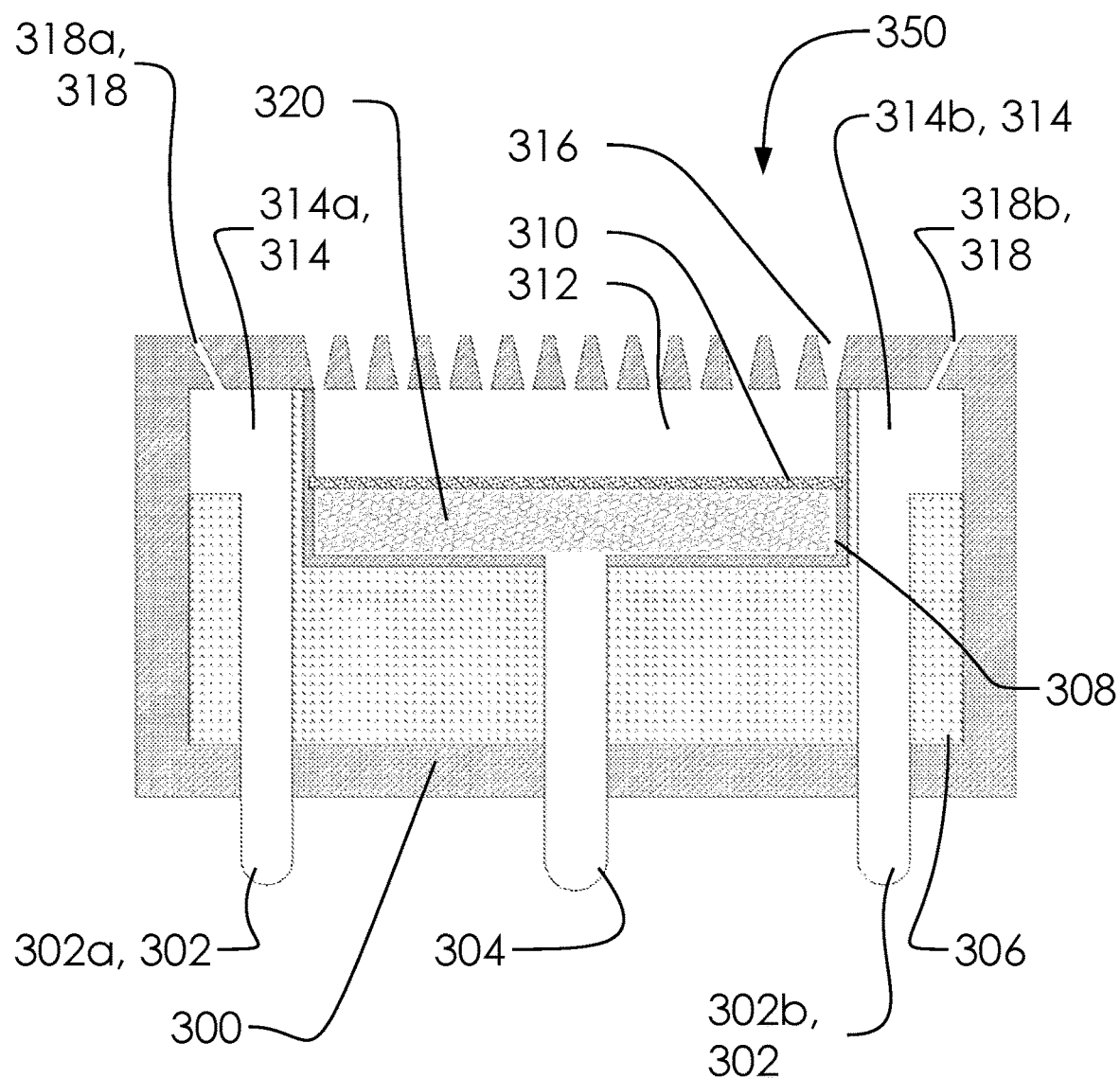
FIG. 3 illustrates an elevated front side view of a burner tip main body 300 in cross-section.

FIG. 3 illustrates an elevated front side view of a burner tip main body 300 in cross-section.

In one embodiment, said burner tip main body 300 can comprise said one or more cooling steam inlets 302, said premixed H2-O2 inlet 304, said insulating medium 306, said premixed H2-O2 receiving chamber 308, said sintered plate 310, said premixed H2-O2 upper chamber 312, said one or more cooling steam chambers 314, said premixed H2-O2 injector array 316 and said one or more steam injectors 318.

In one embodiment, said one or more cooling steam chambers 314 can comprise said first cooling steam chamber 314a and said second cooling steam chamber 314b.

In one embodiment, said one or more steam injectors 318 can comprise said first steam injector 318a and said second steam injector 318b.

In one embodiment, said one or more cooling steam inlets 302 can comprise said first cooling steam inlet 302a and said second cooling steam inlet 302b.

In one embodiment, said premixed H2-O2 receiving chamber 308 can comprise said flow velocity equalizer medium 320.

In one embodiment, said steam generator system 100 can comprise said burner tip main body 300.

In one embodiment, said burner tip 350 can comprise said burner tip main body 300, said one or more cooling steam inlets 302, said first cooling steam inlet 302a, said second cooling steam inlet 302b, said premixed H2-O2 inlet 304, said insulating medium 306, said premixed H2-O2 receiving chamber 308, said sintered plate 310, said premixed H2-O2 upper chamber 312, said one or more cooling steam chambers 314, said first cooling steam chamber 314a, said second cooling steam chamber 314b, said premixed H2-O2 injector array 316, said one or more steam injectors 318, said first steam injector 318a, said second steam injector 318b and said flow velocity equalizer medium 320.

In one embodiment, said steam generator 106 can comprise two sections, namely, said burner tip 350 and said steam generation chamber 550.

In one embodiment, said burner tip main body 300 can comprise a cylindrical structure. Said burner tip main body 300 can be made of material capable of handling high-pressure and temperature. Said burner tip main body 300 can help in collectively holding the sections of said burner tip 350 together.

In one embodiment, said one or more cooling steam inlets 302 can receive said cooling steam 220 from said cooling unit 104. The cooling steam 220 can be either HP-LT steam 222 from said steam flow controller 216 or a steam-mist mixture 224 from said steam-water mixer 218. Said one or more cooling steam inlets 302 can comprise an inline reverse-flow check valve which prevents reverse flow of any exhaust or explosive mixture from said steam generator 106 to said cooling unit 104.

In one embodiment, said premixed H2-O2 inlet 304 can receive a premixed H2-O2 226 from said hydrogen-oxygen handling unit 102. Said premixed H2-O2 inlet 304 can comprise an inline, reverse-flow check valve, which prevents reverse flow of any exhaust or explosive mixture from said steam generator 106 to said hydrogen-oxygen handling unit 102.

In one embodiment, said premixed H2-O2 226 from said hydrogen-oxygen handling unit 102 enters said burner tip 350 through said premixed H2-O2 inlet 304 and reaches said premixed H2-O2 receiving chamber 308.

In one embodiment, said premixed H2-O2 receiving chamber 308 can contain a flow velocity equalizer medium 320. Said flow velocity equalizer medium 320 can be included or omitted depending on a desired settings for an inlet pressure and velocity of said premixed H2-O2 226 to attain a favorable velocity and pressure for combustion process. In one embodiment, said flow velocity equalizer medium 320 can comprise small spherical balls or glass wool.

In one embodiment, said sintered plate 310 separates said premixed H2-O2 receiving chamber 308 from said premixed H2-O2 upper chamber 312. Said sintered plate 310 helps in quenching the flashback and backfire in case of occurrence and prevents it from entering said hydrogen-oxygen handling unit 102. In one embodiment, said sintered plate 310 can also be replaced with multiple sintered disks or sintered cylinders or a combination of both depending on the pressure of incoming said premixed H2-O2 226 and pressure loss at the sintered disk or cylinder.

In one embodiment, said premixed H2-O2 226 can pass through said sintered plate 310 and reach said premixed H2-O2 upper chamber 312. Said premixed H2-O2 upper chamber 312 can be more beneficial for combustion, especially during load cycling, by acting as a small reservoir to help stabilize the pressure of said premixed H2-O2 226 before injecting it into said steam generation chamber 550 for combustion.

In one embodiment, said one or more cooling steam chambers 314 receives cooling steam 220 from said one or more cooling steam inlets 302. Said one or more cooling steam chambers 314 acts as a small reservoir for cooling steam 220 to help stabilize the pressure, especially during load cycling.

In one embodiment, said premixed H2-O2 226 in said premixed H2-O2 upper chamber 312 exits through said premixed H2-O2 injector array 316 into said steam generation chamber 550. The number of said premixed H2-O2 injector array 316, the size of injectors and angle of inclination in said premixed H2-O2 injector array 316 can be optimized for a flow rate, velocity and pressure of said premixed H2-O2 226 as it exits through said premixed H2-O2 injector array 316 to enhance combustion without flash backs at various loading conditions.

Figure 4:
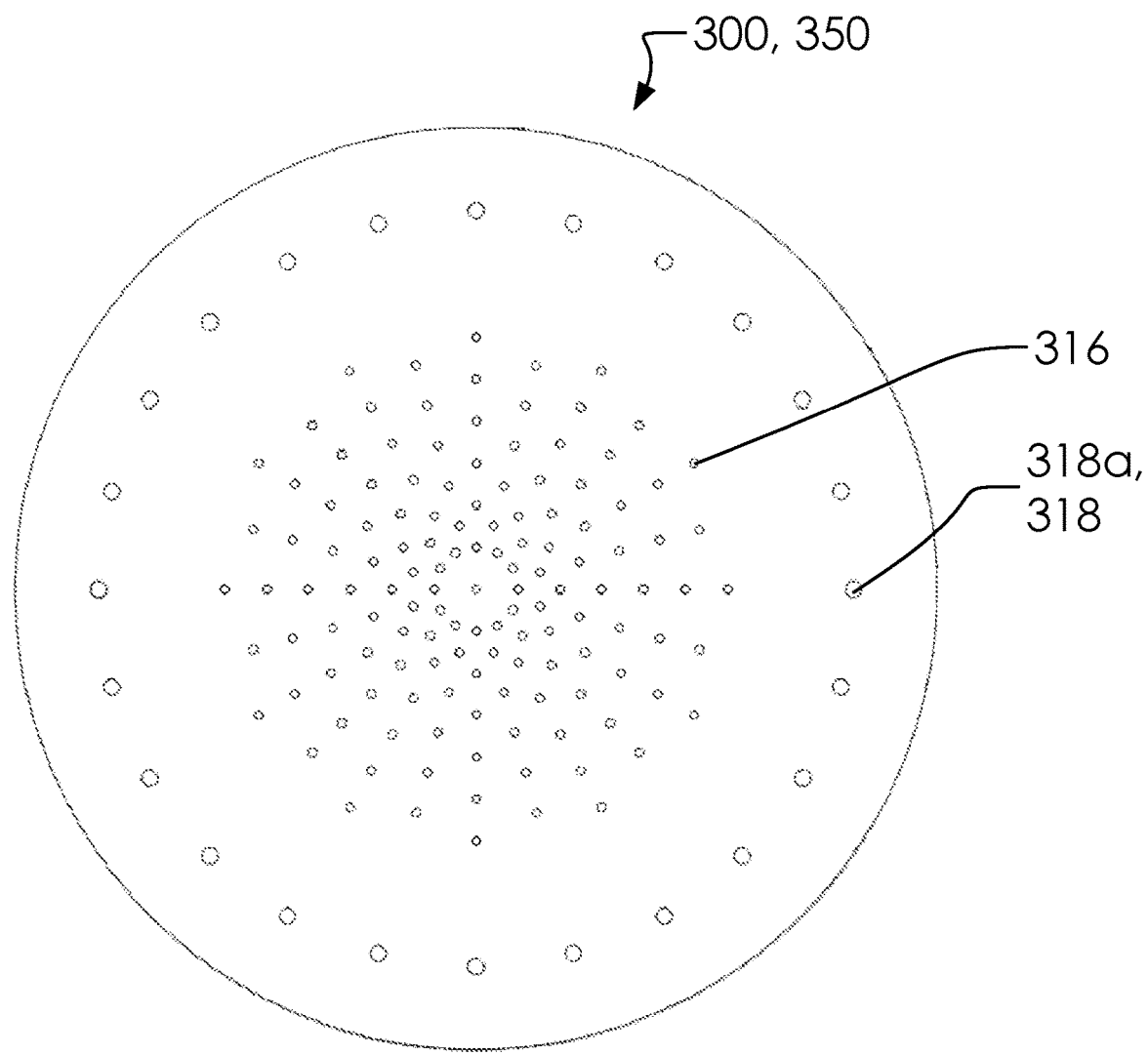
FIG. 4 illustrates an elevated top side view of a burner tip 350.

FIG. 4 illustrates an elevated top side view of a burner tip 350.

The number of said one or more steam injectors 318 and angle of inclination can be optimized for the flow rate, velocity and pressure of the cooling steam 220 exiting through said one or more steam injectors 318.

Figure 8:
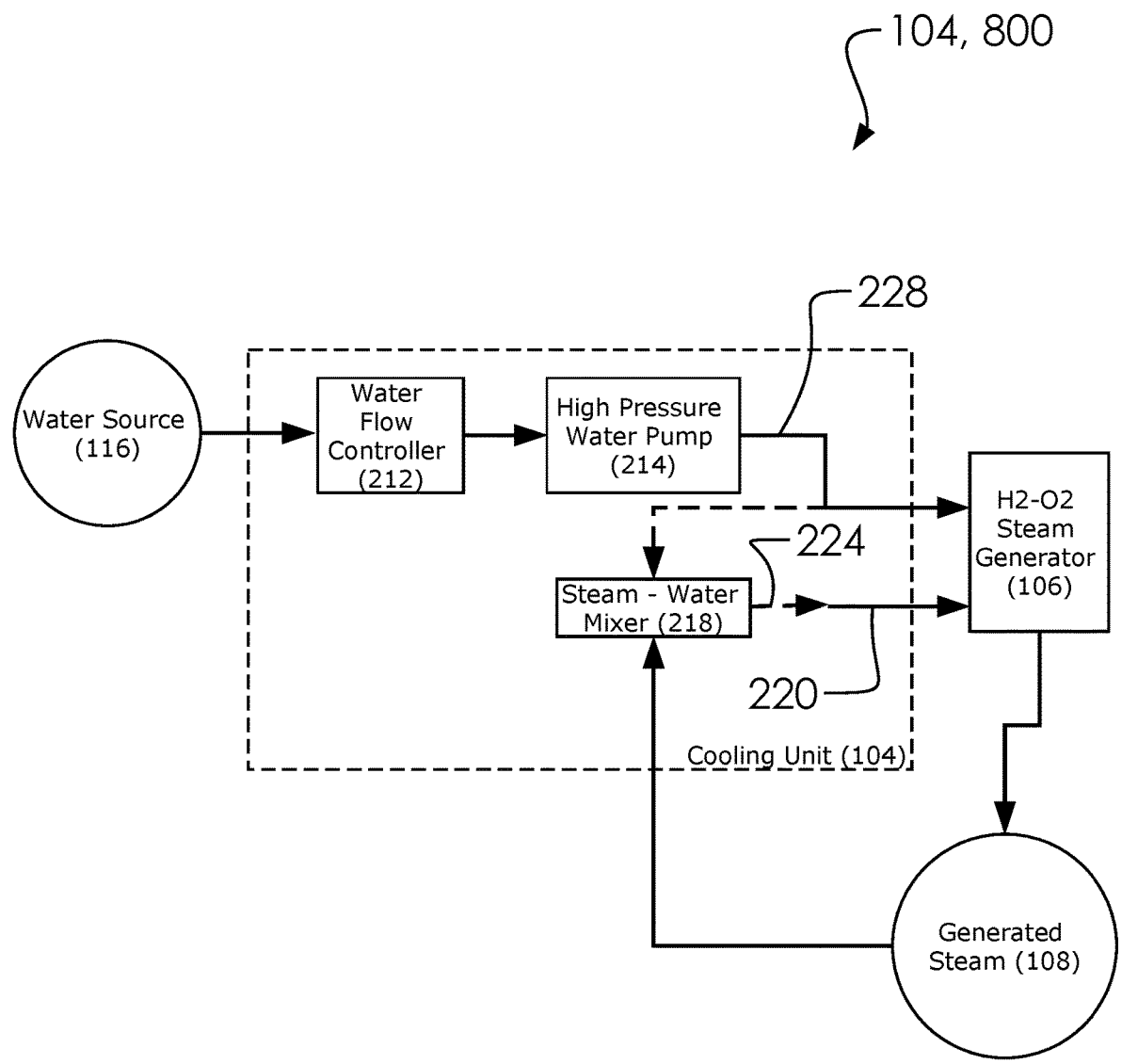
FIG. 8 illustrates block diagram view of an alternative cooling unit 800.

Discussed below in the description of FIG. 8 is an embodiment of said steam generator system 100 with said generated steam 108 used as an input to said steam-water mixer 218 for generation of said cooling steam 220.

Figure 5:
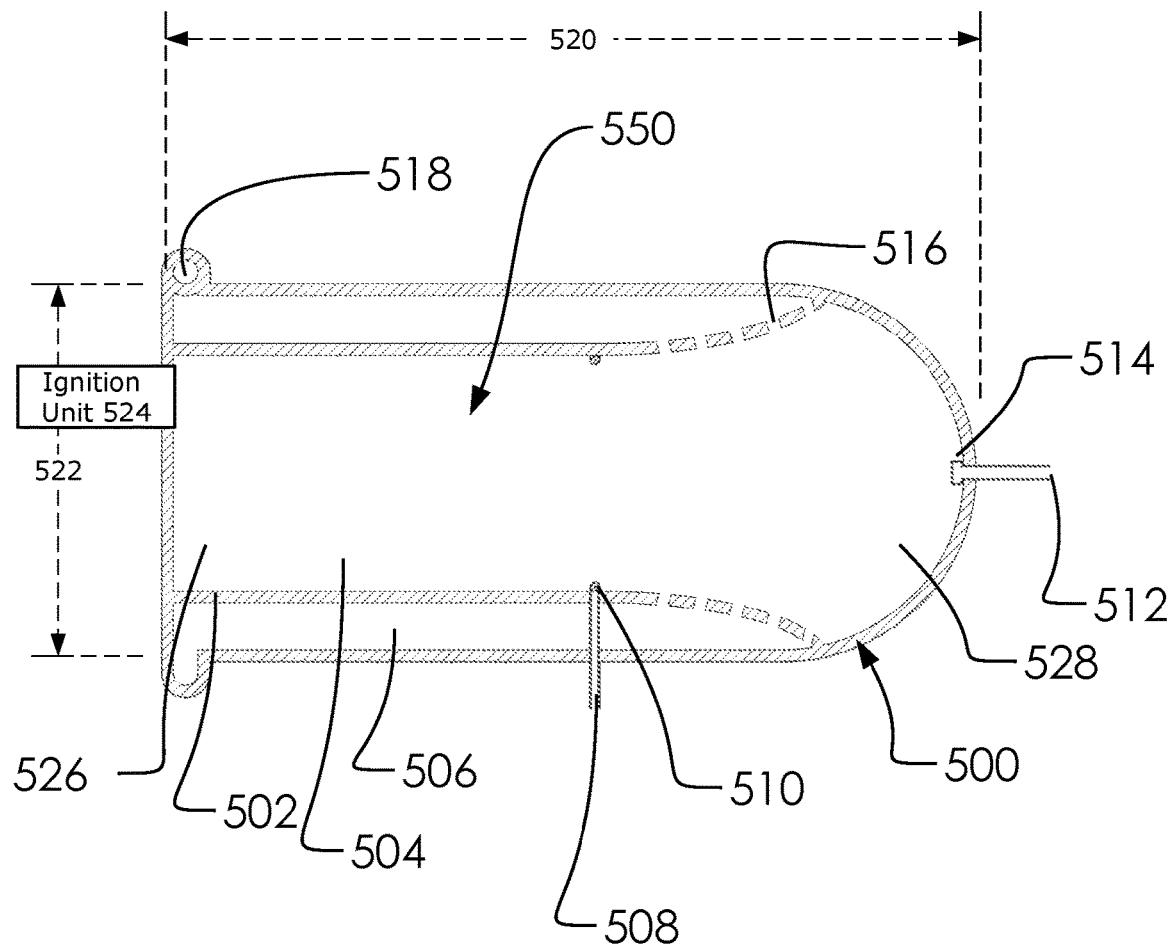
FIG. 5 illustrates an elevated front side view of a burner tip mounting frame 500 in cross-section.

FIG. 5 illustrates an elevated front side view of a burner tip mounting frame 500 in cross-section.

In one embodiment, said burner tip mounting frame 500 can comprise said liner 502, said inner pass 504, said outer pass 506, said cooling steam inlet 508, said steam injector ring 510, said cooling water inlet 512, said water spray nozzle 514, said liner steam vent 516, said steam exit vent 518, said length 520 and said width 522.

In one embodiment, said inner pass 504 can comprise said front end 526 and said rear end 528.

In one embodiment, said steam generator 106 can comprise said ignition unit 524. Said ignition unit 524 can be a spark ignitor, pilot ignitor, gas ignitor and it is adopted as according to the steam generation capacity, operating pressure and temperature of the said steam generator 106.

In one embodiment, said steam generation chamber 550 can comprise said burner tip mounting frame 500, said liner 502, said inner pass 504, said outer pass 506, said cooling steam inlet 508, said steam injector ring 510, said cooling water inlet 512, said water spray nozzle 514, said liner steam vent 516 and said steam exit vent 518.

In one embodiment, the cooling steam 220 from said one or more cooling steam chambers 314 exits through said one or more steam injectors 318 into said steam generation chamber 550. Said one or more steam injectors 318 can be inclined in such a way that it provides a steam film (not illustrated) along a side of said inner pass 504 of said liner 502 within said steam generation chamber 550; wherein, said cooling steam 220 acts as a coolant to prevent thermal meltdown or other damages due to thermal stress during a combustion of said premixed H2-O2 226.

In one embodiment, said water spray nozzle 514 can comprise increased-pressure water.

In one embodiment, said steam generation chamber 550 can be a solid structure capable of handling high-pressure and temperature. Said length 520 and said width 522 can be altered to achieve variations in the temperature, flow rate, and pressure of said generated steam 108.

In one embodiment, said burner tip mounting frame 500 has the required opening, sealants and brackets to accommodate said burner tip 350 and an ignition unit being appropriate for the use of said steam generator system 100. Said burner tip mounting frame 500 can be at the front end of said steam generation chamber 550.

In one embodiment, said steam generation chamber 550 can comprise a two-pass design which can comprise said inner pass 504 and said outer pass 506. In said inner pass 504, combustion of H2-O2 occurs in the front end of the chamber and injection of water and/or steam occurs at the middle and rear end of said inner pass 504. Complete mixing of coolant and combustion resultant occurs at said outer pass 506.

In one embodiment, said liner 502 can be a wall separating said inner pass 504 and said outer pass 506. It can be made of a good heat conductor to evenly distribute the temperature to avoid hot spots and undergo less thermal stress. Copper can be the choice for said liner 502.

In one embodiment, said outer pass 506 can have fins or other appropriate structure attached to said liner 502 to enhance the heat transfer between streams in said inner pass 504 and said outer pass 506.

In one embodiment, said cooling steam inlet 508 receives said cooling steam 220 from said cooling unit 104 and passes it to said steam injector ring 510. Said cooling steam 220 can be either HP-LT steam from said steam flow controller 216 or a mixture of HP-LT steam and water mist from said steam-water mixer 218. Said cooling steam inlet 508 can comprise an inline reverse-flow check valve, which can be configured to prevent reverse flow of any exhaust or explosive mixture from said steam generation chamber 550 to said cooling unit 104. The number of said cooling water inlet 512 and the size of the cooling water inlet 512 are optimized for the flow rate and pressure of cooling steam 220 from said cooling unit 104.

In one embodiment, said steam injector ring 510 receives cooling steam 220 through said cooling steam inlet 508 and injects it into said inner pass 504 using a series of ports in a ring structure attached to said liner 502 of said inner pass 504. The number of ring structures and ports in each ring structure are optimized for the flow rate and pressure of cooling steam 220 from said cooling unit 104.

In one embodiment, said cooling water inlet 512 receives cooling water from said cooling unit 104 and passes it to said water spray nozzle 514.

In one embodiment, said water spray nozzle 514 receives said cooling steam 220 through said cooling water inlet 512 and can there after injects it into said inner pass 504. Said inner pass 504 can be at the rear end of said steam generator 106. The size of the cooling water inlet 512 and the number of said water spray nozzle 514 are optimized for the flow rate and pressure of said cooling steam 220.

In one embodiment, the position of said steam injector ring 510 and said water spray nozzle 514 depends on the flame length and required flow rate, temperature and pressure of said generated steam 108 being generated in said steam generation chamber 550. Optimum placement of said steam injector ring 510 and said water spray nozzle 514 helps to generate said generated steam 108 at required temperatures and pressures with minimal temperature deviation and hot spots.

In one embodiment, said liner steam vent 516 are configured to allow the coolant and combustion resultant to reach said outer pass 506 from said inner pass 504. The size and number of holes represented by said liner steam vent 516 can be determined by the flow rate of hydrogen, oxygen and coolant, as well as the rated operating pressure inside said steam generation chamber 550.

In one embodiment, said cooling steam inlet 508 can also be placed in the middle or front end of the separator wall for optimum efficiency. This can depend on the cooling steam 220 and cooling water mass flow rate and rated maximum operating temperature and pressure of said generated steam 108.

In one embodiment, said generated steam 108 exits said steam generation chamber 550 through said steam exit vent 518. The optimum position of said steam exit vent 518 depends on the flow rate of said generated steam 108, positioning of said liner steam vent 516 and flow rate of cooling steam 220 and cooling water.

FIG. 6A illustrates block diagram view of a water only configuration 600a.

FIG. 6B illustrates block diagram view of a steam only configuration 600b.

In one embodiment, said cooling unit 104 can comprise said water only configuration 600a and said steam only configuration 600b.

In one alternative embodiment, said water source 116 or said steam source 118 can be optional.

As illustrated in said water only configuration 600a, in one embodiment, said steam generator system 100 can comprise only of said water source 116 and not said steam source 118; wherein, said increased-pressure water 228 can be directed into said steam generator 106 for cooling without said cooling steam 220.

As illustrated in said steam only configuration 600b, in one embodiment, said steam source 118 can be preferred over said water source 116, provided that said steam source 118 is readily available. Thus, in one embodiment said steam source 118 can be injected into said steam generator 106 for temperature regulating purposes.

In one embodiment, when said increased-pressure water 228 comprises the only coolant, said cooling steam inlet 508, said steam injector ring 510, said one or more cooling steam inlet 302, said one or more cooling steam chamber 314 and said one or more steam injector 318 can be modified to inject water. When cooling steam 220 comprises the only coolant, said cooling water inlet 512 and said water spray nozzle 514 can be modified to accommodate steam. Depending on the generated steam temperature, pressure and quantity, one or more of said cooling steam inlet 508, said steam injector ring 510, said one or more cooling steam inlet 302, said one or more cooling steam chamber 314 and said one or more steam injector 318 can be modified to inject water and one or more of said cooling water inlet 512 and said water spray nozzle 514 can be modified to accommodate steam to optimize the performance and improve the steam quality.

Figure 7:
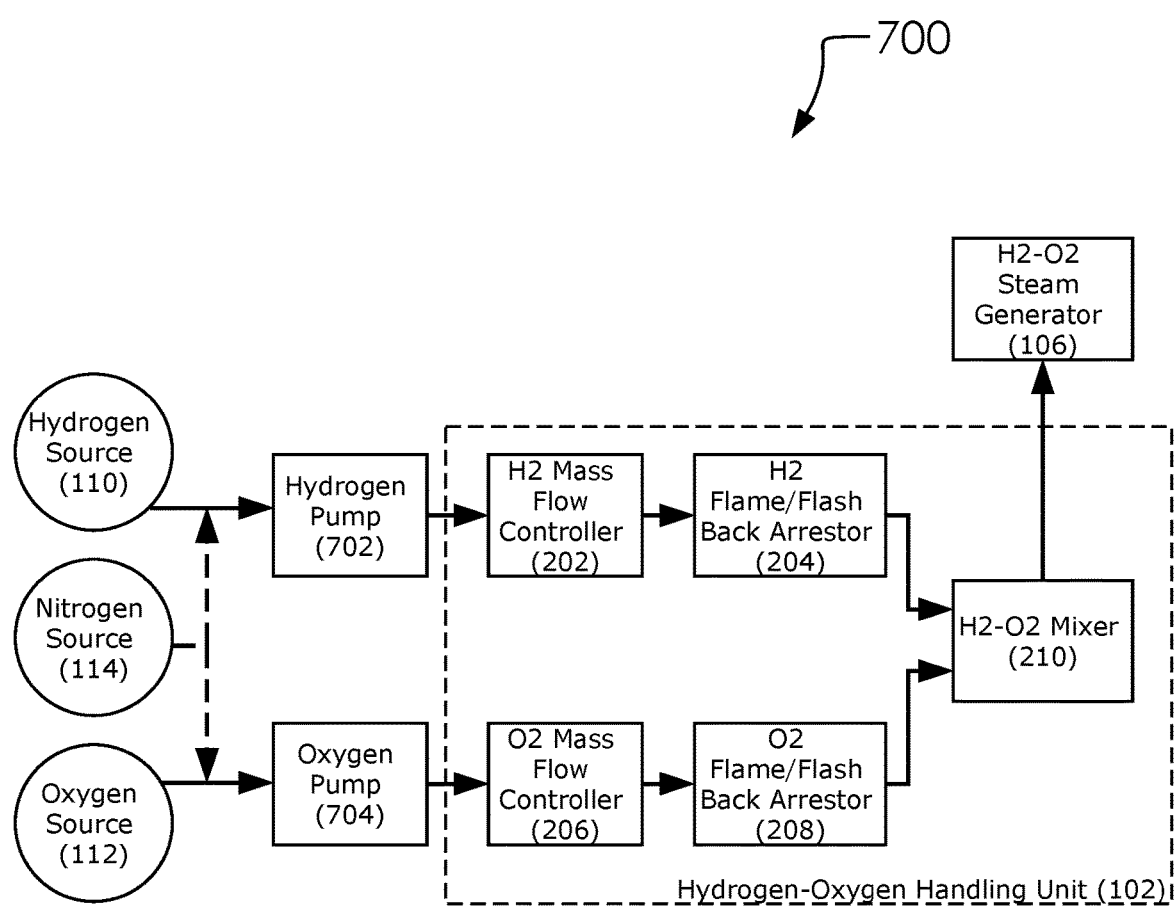
FIG. 7 illustrates block diagram view of an alternative configuration 700.

FIG. 7 illustrates block diagram view of an alternative configuration 700.

In one embodiment, said hydrogen-oxygen handling unit 102 can comprise said alternative configuration 700, said hydrogen pump 702 and said oxygen pump 704.

In one embodiment, said oxygen source 112 can supply oxygen under pressure to said hydrogen-oxygen handling unit 102. In one embodiment, where said oxygen source 112 comprises pressure below a minimum threshold, said oxygen pump 704 can be used to attain necessary pressure of oxygen for operation within said hydrogen-oxygen handling unit 102. Likewise, where said hydrogen source 110 is below a desired pressure, said hydrogen pump 702 can be used to attain necessary pressure of hydrogen for operation before entering said hydrogen-oxygen handling unit 102.

In one embodiment, said hydrogen pump 702 and said oxygen pump 704 can be built into said hydrogen-oxygen handling unit 102 or, as illustrated, said hydrogen pump 702 and said oxygen pump 704 can be outside of said hydrogen-oxygen handling unit 102.

FIG. 8 illustrates block diagram view of an alternative cooling unit 800.

In one embodiment, said cooling unit 104 can comprise said alternative cooling unit 800.

In one embodiment, if said steam source 118 is absent in said steam generator system 100, then a portion of said generated steam 108 can be reused. In such case, a portion of said generated steam 108 can be directed to said steam-water mixer 218 where it can be mixed with increased-pressure water 228 to form said cooling steam 220 and then feed into said one or more cooling steam inlets 302 of said burner tip 350 for temperature regulation purposes.

In one embodiment, depending on the operation temperature and pressure of said generated steam 108 and coolant phase (steam or water), the steam cooling setup in burner tip (said one or more cooling steam inlets 302, said one or more cooling steam chambers 314 and said one or more steam injectors 318) can be removed without posing any significant risk to said steam generation chamber 550 and said burner tip 350.

In one embodiment, if said steam source 118 is absent from the system, a portion of said generated steam 108 can be reused. In such case a portion of said generated steam 108 can be directed to said steam-water mixer 218 where it can be mixed with increased-pressure water 228 mist to form said cooling steam 220 and then fed into said cooling steam inlet 508 of said steam generation chamber 550 for cooling purposes.

In one embodiment, said steam generator system 100 can be useful for power generation, in locomotives for propulsion, and in combined heat and power generation.

In one embodiment, said steam generator system 100 can work alongside or completely replace the conventional burners in steam- or gas-turbine power plants to generate power at reduced or zero pollution, provided that the hydrogen is generated from or using renewable energy sources.

In one embodiment, said steam generator system 100 can work along with a steam engine, steam-turbine, gas-turbine, or electric hybrid engine. It can completely replace gasoline, diesel, oil or gas engines in trucks, trains, submarines, ships, tanks etc. to increase efficiency at reduced or zero pollution, provided that the hydrogen is generated from or using renewable energy sources.

In one embodiment, said steam generator system 100 can be useful for both power generation and heat energy utilization. One such example, but not limited to this, is cane sugar production, in which said steam generator system 100 can produce high-pressure high-temperature steam which passes through a steam turbine or steam-injected gas turbine to generate electric power. The exhaust steam from the turbine can be used in industrial processing of cane sugar.

Figure 9:
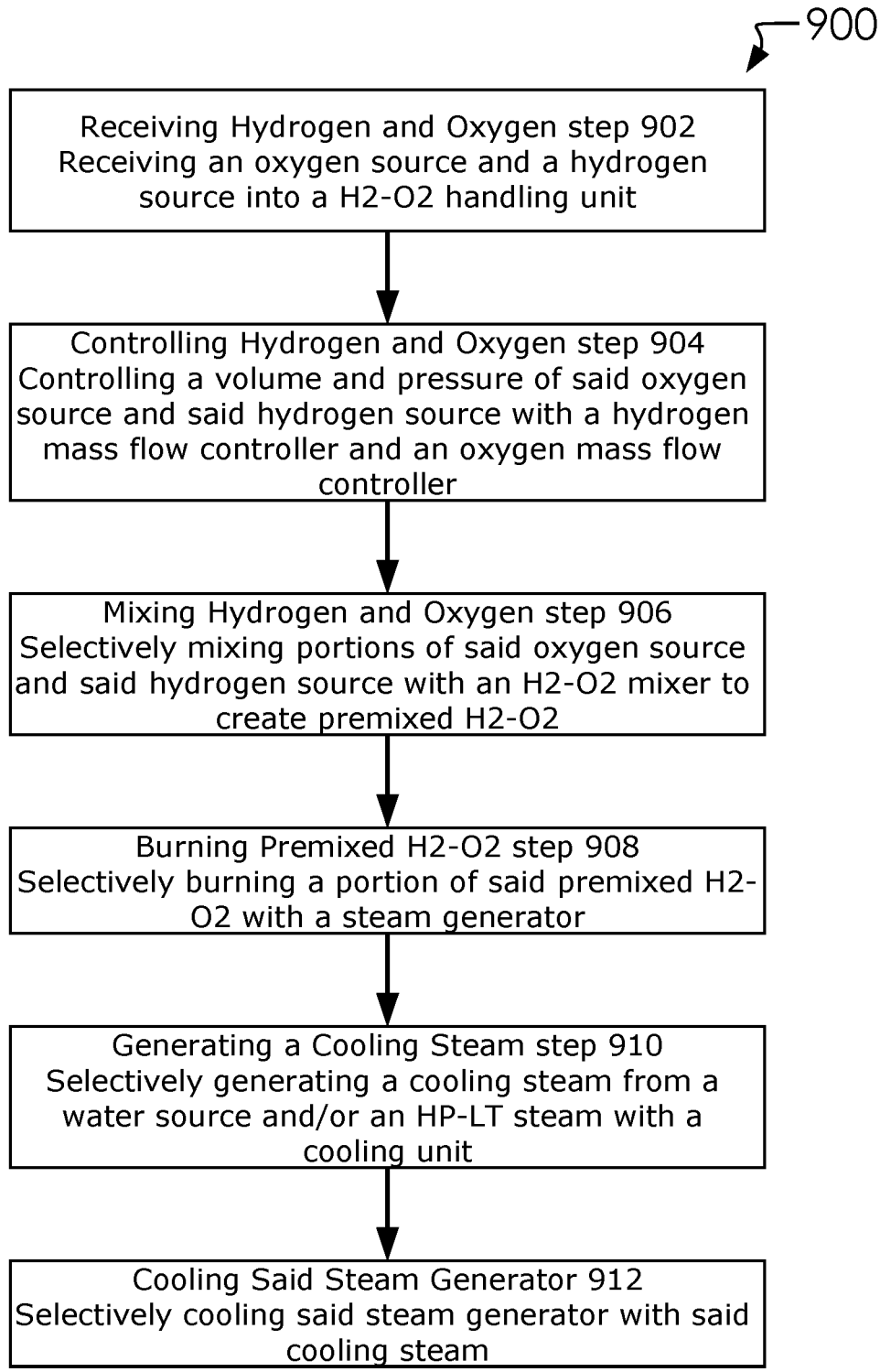
FIG. 9 illustrates a flow chart view of a method of burning H2-O2 900.

FIG. 9 illustrates a flow chart view of a method of burning H2-O2 900.

In one embodiment, said method of burning H2-O2 900 can comprise said receiving H2 and O2 step 902, said controlling H2 and O2 step 904, said mixing H2 and O2 step 906, said burning premixed H2-O2 step 908, said generating cooling steam step 910 and said cooling steam generator step 912.

In one embodiment, said method of burning H2-O2 900 can comprise a method of using steam generator system 100.

receiving H2 and O2 step 902 can comprise receiving hydrogen source 110 and oxygen source 112 into hydrogen-oxygen handling unit 102. controlling H2 and O2 step 904 can comprise using portions of hydrogen-oxygen handling unit 102 to control intake of hydrogen source 110 and oxygen source 112. mixing H2 and O2 step 906 can comprise creating premixed H2-O2 226 with hydrogen-oxygen handling unit 102. burning premixed H2-O2 step 908 and generating cooling steam step 910 can comprise burning premixed H2-O2 226 with steam generator 106 to create generated steam 108. cooling steam generator step 912 can comprise receiving water source 116 and steam source 118 into cooling unit 104 to generate increased-pressure water 228 and cooling steam 220 for cooling steam generator 106.

The following sentences are included for completeness of this disclosure with reference to the claims.

A steam generator system 100 configured to burn hydrogen and oxygen at stoichiometry along with a increased-pressure water 228 and steam. Said steam generator system 100 comprise a hydrogen source 110, an oxygen source 112, a nitrogen source 114, a water source 116, a steam source 118, a hydrogen-oxygen handling unit 102, a cooling unit 104, a one or more H2-O2 steam generators 106 and a control unit 120. Said steam generator system 100 is configured to provide said hydrogen source 110 to said hydrogen-oxygen handling unit 102 through an oxygen passage 122, said oxygen source 112 to said hydrogen-oxygen handling unit 102 through a hydrogen passage 124, and said nitrogen source 114 to selectively purge said oxygen passage 122 and said hydrogen passage 124. Said water source 116 provide water to said cooling unit 104. Said cooling unit 104 is configured to receive said water source 116 and said steam source 118. Said hydrogen-oxygen handling unit 102 is configured to blend portions of said hydrogen source 110 and said oxygen source 112 into a premixed H2-O2 226, and to selectively send portions of said premixed H2-O2 226 to said one or more H2-O2 steam generators 106. Said cooling unit 104 is configured to receive and process said water source 116 and said steam source 118 into a cooling steam 220 and said increased-pressure water 228, and to selectively send said cooling steam 220 and said increased-pressure water 228 to said one or more H2-O2 steam generators 106. Said premixed H2-O2 226 is at stoichiometry. Said one or more H2-O2 steam generators 106 is configured to burn said premixed H2-O2 226, and to cool said one or more H2-O2 steam generators 106 with said cooling steam 220 and said increased-pressure water 228 and thereby to generate a generated steam 108. Said control unit 120 receives input signals and data from various components of said steam generator system 100, processes it, and controls various instruments in the system.

Said hydrogen source 110 comprising hydrogen in liquid phase or gaseous phase stored in a one or more containers selected among: gas cylinders, geological storage, and metal hydrides. Where said hydrogen source 110 consists of liquid or low-pressure hydrogen, said steam generator system 100 further comprises a hydrogen vaporizer and a hydrogen pump 702 respectively used to produce gaseous hydrogen at the necessary pressure for operation before it enters said hydrogen-oxygen handling unit 102. Said hydrogen source 110 comprises an industrial grade, with some impurities are accommodated depending on the final temperature, pressure, quality and usage of the steam generated by said steam generator system 100.

Said oxygen source 112 having oxygen in gaseous phase or liquid phase stored under pressure in one or more containers selected among: a gas cylinders, geological storage, from an industrial process, or in liquid phase. Where said oxygen source 112 consists of liquid or low-pressure oxygen, said steam generator system 100 further comprises an oxygen vaporizer and an oxygen pump 704 respectively, wherein. Said oxygen vaporizer and said oxygen pump 704 are used to produce gaseous oxygen at the necessary pressure for operation before it enters said hydrogen-oxygen handling unit 102. A purity of said oxygen are of industrial grade with some impurities depending on the final temperature, pressure, quality and usage of the steam generated by said steam generator system 100.

Said nitrogen source 114 having nitrogen in gaseous phase stored under pressure in gas cylinders, or other containers. Said nitrogen source 114 provides nitrogen under pressure to purge the hydrogen and oxygen conduit before and after operation of said steam generator system 100.

Said nitrogen source 114 is replaced with an inert gas.

Said water source 116 is de-mineralized water comprising added chemicals to prevent rusting in said steam generator system 100.

Said steam source 118 is a high-pressure low temperature steam.

Said hydrogen-oxygen handling unit 102 comprise a hydrogen mass flow controller 202, a hydrogen flame flash back arrestor 204, an oxygen mass flow controller 206, an oxygen flame flash back arrestor 208, a H2-O2 mixer 210.

Said hydrogen mass flow controller 202 is configured to receive said hydrogen source 110 and regulating its flow. Said hydrogen flame flash back arrestor 204 is configured to quench a flame during a flame/flash-back occurrence and preventing it from reaching said hydrogen source 110. Said oxygen mass flow controller 206 receives said oxygen source 112 and regulating its flow. Said oxygen flame flash back arrestor 208 is configured to quench a flame during a flame/flash-back occurrence and preventing it from reaching said oxygen source 112. Said H2-O2 mixer 210 is configured to receive said hydrogen source 110 from said hydrogen mass flow controller 202 and said oxygen source 112 from said oxygen mass flow controller 206, uniformly mix said hydrogen source 110 and said oxygen source 112 at stoichiometry into said premixed H2-O2 226, and send said premixed H2-O2 226 to said one or more H2-O2 steam generators 106.

Said one or more H2-O2 steam generators 106 comprise a burner tip 350 and a steam generation chamber 550. Said burner tip 350 is configured to receive said premixed H2-O2 226 from said hydrogen-oxygen handling unit 102, said increased-pressure water 228 from said cooling unit 104, and said cooling steam 220 from said cooling unit 104. Said steam generation chamber 550 is configured to combust said premixed H2-O2 226 and mix said cooling steam 220 and/or said increased-pressure water 228 to create said generated steam 108 at a desired temperature and pressure.

Said steam generation chamber 550 comprising a burner tip mounting frame 500, a liner 502, an inner pass 504, an outer pass 506, a cooling steam inlet 508, a steam injector ring 510, a cooling water inlet 512, a water spray nozzle 514, a liner steam vent 516, a steam exit vent 518, and an ignition unit 524. Said burner tip mounting frame 500 is configured for mounting said burner tip 350 and said ignition unit 524 into said steam generation chamber 550. Said liner 502 which divides the hollow interior of said steam generation chamber 550 into two passes. Said inner pass 504 at which the combustion of said premixed H2-O2 226 occurs and said increased-pressure water 228 and/or a steam-water mist mixture 224 are injected. Said outer pass 506 at which the combustion product of said premixed H2-O2 226 combustion and the coolant (water or steam or both) mix to form said generated steam 108 at desired temperature. Said cooling steam inlet 508 is configured for receiving said cooling steam 220 from said cooling unit 104. Said steam injector ring 510 is configured for injecting said cooling steam 220. Said cooling water inlet 512 is configured for receiving said increased-pressure water 228 from said cooling unit 104. Said water spray nozzle 514 is configured for injecting said increased-pressure water 228. Said liner steam vent 516 is configured to allow a mixture of steam to pass from said inner pass 504 to said outer pass 506. Said steam exit vent 518 is configured to selectively vent said generated steam 108 out of said steam generation chamber 550. Said ignition unit 524 configured to ignite said premixed H2-O2 226 at said inner pass 504.

Said steam generator system 100 is configured with a size and number of a liner steam vent 516 to optimize a flowrate of hydrogen, oxygen and coolant, as well as the rated operating pressure inside said steam generation chamber 550.

A steam injector ring 510 is configured to inject said cooling steam 220 into an inner pass 504 using a series of ports in a ring structure attached to a liner 502 of said inner pass 504. The number of ring structures and ports in the ring structures are optimized for the flow rate and pressure of said cooling steam 220 from said cooling unit 104.

Placement of a cooling steam inlet 508, a steam injector ring 510, a cooling water inlet 512, a water spray nozzle 514, a liner steam vent 516, and a steam exit vent 518 to get maximum thermal efficiency with reduced pressure losses and hot spots depends on the flowrate of said premixed H2-O2 226, said cooling steam 220, and said cooling steam 220, and the rated maximum operating temperature and pressure of said generated steam 108.

An outer pass 506 comprises fins attached to a liner 502 to enhance the heat transfer between the stream in an inner pass 504 and said outer pass 506 and allow proper mixing of the coolant and combustion resultant of said premixed H2-O2 226.

A liner 502 comprises a heat conductor configured to distribute the heat over its surface area to avoid hot spots during the combustion process.

Said burner tip 350 comprising a burner tip main body 300, a cooling steam inlet 508, a premixed H2-O2 inlet 304, an insulating medium 306, a premixed H2-O2 receiving chamber 308, a sintered plate 310, a premixed H2-O2 upper chamber 312, a one or more cooling steam chambers 314, a premixed H2-O2 injector array 316 and a one or more steam injectors 318. Said burner tip main body 300 is configured to hold the parts of said burner tip 350 in place for safe and sustained operation. Said cooling steam inlet 508 is configured for receiving said cooling steam 220 from said cooling unit 104. Said premixed H2-O2 inlet 304 is configured for receiving said premixed H2-O2 226 from said hydrogen-oxygen handling unit 102. Said insulating medium 306 configured for preventing heat loss of said cooling steam 220 and heat transfer between said cooling steam 220 and said premixed H2-O2 226. Said premixed H2-O2 receiving chamber 308 configured for receiving said premixed H2-O2 226 from said premixed H2-O2 inlet 304. Said sintered plate 310 is configured to act as a flame/flash-back arrestor to prevent damage to said burner tip 350 during flame/flash-back occurrence. Said premixed H2-O2 upper chamber 312 is configured for receiving said premixed H2-O2 226 from said premixed H2-O2 receiving chamber 308, after passing through said sintered plate 310 and stabilizing said premixed H2-O2 226 gas pressure, and before being injected into said steam generation chamber 550. Said one or more cooling steam chambers 314 is configured for receiving said cooling steam 220 from said cooling steam inlet 508, and stabilizing a steam pressure of said cooling steam 220 before being injected into said steam generation chamber 550. Said premixed H2-O2 injector array 316 is configured for injecting said premixed H2-O2 226 into said steam generation chamber 550 for combustion. Said one or more steam injectors 318 is configured for injecting said cooling steam 220 into said steam generation chamber 550 for cooling a liner 502 on an inner pass 504.

Said insulating medium 306 is liquid, solid or in gaseous phase, depending on the temperature of said cooling steam 220.

Said premixed H2-O2 receiving chamber 308 contains a flow velocity equalizer medium 320 to attain a favorable velocity and pressure for the combustion process depending on the inlet pressure and velocity of said premixed H2-O2 226 entering said premixed H2-O2 receiving chamber 308.

Said sintered plate 310 is replaced with multiple sintered disks or sintered cylinders, or a combination of both, depending on the pressure of said premixed H2-O2 226 and acceptable pressure loss at the sintered disk or cylinder.

Said premixed H2-O2 injector array 316 with injector size, arrangement and angle of inclination are optimized for the flowrate, velocity and pressure of said premixed H2-O2

226 at exit of said premixed H2-O2 injector array 316 to enhance combustion without flashbacks at various loading conditions.

Said one or more steam injectors 318 is inclined in such a way that it provides a steam film along said inner pass 504 side of said liner 502 of said steam generation chamber 550 which acts as a coolant to prevent thermal meltdown or other damages due to thermal stress during said premixed H2-O2 226 combustion. The number of said one or more steam injectors 318 and angle of inclination is optimized for the flowrate, velocity and pressure of said cooling steam 220 exiting through the injectors. Provided adequate a HP-LT steam 222 is not available or more cooling is required for the inner surface of said liner 502, said cooling steam inlet 508 and said one or more steam injectors 318 of said burner tip 350 are configured to handle said increased-pressure water 228.

Said steam generator system 100 is configured to operate without said water source 116 which feeds said increased-pressure water 228 into said cooling unit 104. Said cooling unit 104 operates without a water flow controller 212, a high-pressure water pump 214 and a steam-water mixer 218. A cooling water inlet 512 and a water spray nozzle 514 in a steam generation chamber 550 are modified to accommodate a HP-LT steam 222.

Said steam generator system 100 is configured to operate without said steam source 118 which feeds said cooling steam 220 into said cooling unit 104. Said cooling unit 104 operates without a steam flow controller 216 and a steam-water mixer 218. A cooling steam inlet 508, a one or more cooling steam chambers 314 and a one or more steam injectors 318 at a burner tip 350 are configured to be modified to inject said increased-pressure water 228. Said cooling steam inlet 508, a steam injector ring 510, at a steam generation chamber 550 are configured to be modified to inject said increased-pressure water 228.

Said one or more H2-O2 steam generators 106 are configured to create said generated steam 108. Said steam generator system 100 is configured to increase efficiency, provided an absence of said steam source 118 in said steam generator system 100, to direct a portion of said generated steam 108 to said steam-water mixer 218 in said cooling unit 104 for reuse, said portion of said generated steam 108 is mixed with said increased-pressure water 228 to form a steam-water mist mixture 224, said steam-water mist mixture 224 is fed into said cooling steam inlet 508 of said burner tip 350 and said steam generation chamber 550 for cooling purposes.

Said steam source 118 comprises a high-pressure, low-temperature (HP-LT) steam created in a method selected among: an industrial process, a bleed steam from a steam or gas turbine cycle, or a steam generated by waste heat recovery. A portion of said steam source 118 is injecting into a steam-water mixer 218, where said increased-pressure water 228 is misted into a HP-LT steam 222 and then injected into said one or more H2-O2 steam generators 106. A method of burning H2-O2 900 for creating a generated steam 108 comprising the following steps.

Receiving a hydrogen from a hydrogen source 110 into a hydrogen-oxygen handling unit 102 having a hydrogen mass flow controller 202, a H2 flame/flash back arrestor, an oxygen mass flow controller 206, an oxygen flame flash back arrestor 208 and a H2-O2 mixer 210. Monitoring said hydrogen from said hydrogen source 110 with said hydrogen mass flow controller 202 for flow rate, temperature and pressure. Controlling desired flow rate of said hydrogen coming from said hydrogen source 110 with said hydrogen mass flow controller 202 of said hydrogen-oxygen handling unit 102. Further a hydrogen flame flash back arrestor 204 is a safety device, helps in quenches the flame during a flame/flash-back occurrence in the hydrogen passage and preventing it from reaching said hydrogen source 110. From said H2 flame/flash back arrestor, said hydrogen is feed into said H2-O2 mixer 210. Receiving an oxygen source 112 into said hydrogen-oxygen handling unit 102. Monitoring said oxygen from said oxygen source 112 with said oxygen mass flow controller 206 for flow rate, temperature and pressure. Controlling desired flow rate of said oxygen coming from said oxygen source 112 with said oxygen mass flow controller 206 of said hydrogen-oxygen handling unit 102. Further said oxygen flame flash back arrestor 208 is a safety device, helps in quenches the flame during a flame/flash-back occurrence in the oxygen passage and preventing it from reaching said oxygen source 112. From said oxygen flame flash back arrestor 208, said oxygen is feed into said H2-O2 mixer 210. Said H2-O2 mixer 210, receives said hydrogen from said H2 flame/flash back arrestor and said oxygen from said oxygen flame flash back arrestor 208 and mixes in a stoichiometric ratio and feeds it into a premixed H2-O2 inlet 304 of a burner tip 350. Before and after operation of a steam generator system 100, nitrogen from a nitrogen source 114 is used to purge said hydrogen passage and said oxygen passage to ensure safe operation and prevent flame/flash back.

Delivering a premixed H2-O2 226 into said premixed H2-O2 inlet 304 of said burner tip 350, wherein a steam generator comprises said burner tip 350, a steam generation chamber 550 and an ignition unit 524, and said burner tip 350 comprises said premixed H2-O2 inlet 304, an insulating medium 306, a premixed H2-O2 receiving chamber 308, a sintered plate 310 and a premixed H2-O2 upper chamber 312. Said premixed H2-O2 226 passes into said premixed H2-O2 receiving chamber 308, and further pass through said sintered plate 310 into said premixed H2-O2 upper chamber 312. From which said premixed H2-O2 226 is injected in to said steam generation chamber 550 through a premixed H2-O2 injector array 316.

Creating said increased-pressure water 228 and/or a cooling steam 220 with a cooling unit 104. Receiving a water from a water source 116 into a water flow controller 212 of said cooling unit 104. Receiving a steam from a steam source 118 into a steam flow controller 216 of said cooling unit 104. Regulating a flow rate of said water from said water source 116 with said water flow controller 212. Regulating a flow rate of said steam from said steam source 118 with said steam flow controller 216. Pressurizing said water from said water source 116 with said high-pressure water pump 214. Delivering a portion of said increased-pressure water 228 into said steam generator from said high-pressure water pump 214. Delivering a portion of said steam from said steam source 118 to said steam generator as a HP-LT steam 222. A portion of said increased-pressure water 228 and a portion of said steam from said steam source 118 enter a steam-water mixer 218, where it is mixed and send to said steam generator as said HP-LT steam 222.

Said HP-LT steam 222 and said increased-pressure water 228 received at a cooling steam inlet 508 and a cooling water inlet 512 respectively of said steam generation chamber 550 is injected into an inner pass 504 of said steam generation chamber 550 by optimally placing a steam injector ring 510 and a water spray nozzle 514 in such a way that the coolant is sprayed/injected uniformly in to the combustion resultant stream.

The sprayed/injected coolant and the combustion resultant stream exits said inner pass 504 through optimally placed a liner steam vent 516 into an outer pass 506 where it is mixes well and forms a uniformly mixed said HP-LT steam 222 and exits said steam generator system 100 through a steam exit vent 518.

Injecting a portion of said cooling steam 220 into a one or more cooling steam inlets 302 of said burner tip 350. Spraying a portion of said cooling steam 220 out of a one or more steam injectors 318 of said burner tip 350. Configuring said one or more steam injectors 318 at an angle in such a way that it forms a steam film along the inner surface of a liner 502 of said steam generation chamber 550. Cooling a portion of said steam generation chamber 550 with said steam film and/or said cooling steam 220 as a cooling medium for said liner 502. A cooling steam inlet 508 and steam injector of said burner tip 350 are configured to handle said increased-pressure water 228 if adequate said HP-LT steam 222 in not available or more cooling is required for the inner surface of said liner 502.

Igniting said premixed H2-O2 226 with ignited located on a front end 526 of an inner pass 504 of said steam generation chamber 550.

Mixing said oxygen with said hydrogen in said H2-O2 mixer 210 at stoichiometry ratio. A premixed H2-O2 injector array 316 with injector size, arrangement and angle of inclination are optimized for the flowrate, velocity and pressure of a premixed H2-O2 226 at exit of said premixed H2-O2 injector array 316 to enhance combustion without flashbacks at various loading conditions. A sintered plate 310 being replaced with multiple sintered disks or sintered cylinders, or a combination of both, depending on the pressure of incoming said premixed H2-O2 226 and acceptable pressure loss at the sintered disk or cylinder. A premixed H2-O2 receiving chamber 308 can contain a flow velocity equalizer medium 320 configured to adjust an inlet pressure and velocity of said premixed H2-O2 226 entering said premixed H2-O2 receiving chamber 308 to attain a favorable velocity and pressure for the combustion process. Said flow velocity equalizer medium 320 being selected from among small spherical balls or glass wool. An insulating medium 306 are liquid, solid or in gaseous phase, depending on the temperature of a cooling steam 220. A premixed H2-O2 upper chamber 312 receiving said premixed H2-O2 226 from said premixed H2-O2 receiving chamber 308 after passing through said sintered plate 310 and stabilizing said premixed H2-O2 226 gas pressure before being injected into a steam generation chamber 550. A one or more cooling steam chambers 314 configured for receiving a HP-LT steam 222 from a cooling steam inlet 508 and stabilizing the steam pressure before being injected into said steam generation chamber 550.

A control unit 120 receives input signals and data from various components of the system, processes it, and controls various instruments in the system.

Said generated steam 108 has minimal residual from combustion and is free from harmful, polluting greenhouse gases and are used in power generation, in locomotive for propulsion and in combined heat and power generation.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A steam generator system configured to burn hydrogen and oxygen at stoichiometry along with an increased-pressure water and a steam, wherein:
   said steam generator system comprise a hydrogen source, an oxygen source, a nitrogen source, a water source, a steam source, a hydrogen-oxygen handling unit, a cooling unit, a one or more H2-O2 steam generators and a control unit;
   said steam generator system is configured to provide said hydrogen source to said hydrogen-oxygen handling unit through an oxygen passage, said oxygen source to said hydrogen-oxygen handling unit through a hydrogen passage, and said nitrogen source to selectively purge said oxygen passage and said hydrogen passage;
   said water source provide water to said cooling unit;
   said cooling unit is configured to receive said water source and said steam source;
   said hydrogen-oxygen handling unit is configured
      to blend portions of said hydrogen source and said oxygen source into a premixed H2-O2, and
   to selectively send portions of said premixed H2-O2 to said one or more H2-O2 steam generators;
   said cooling unit is configured to receive and process said water source and said steam source into a cooling steam and said increased-pressure water, and
   to selectively send said cooling steam and said increased-pressure water to said one or more H2-O2 steam generators;
   said premixed H2-O2 is at stoichiometry;
   said one or more H2-O2 steam generators is configured
      to burn said premixed H2-O2, and
      to cool said one or more H2-O2 steam generators with said cooling steam and said increased-pressure water and thereby to generate a generated steam; and
   said control unit receives input signals and data from various components of said steam generator system, processes it, and controls various instruments in the system.

2. The steam generator system from claim 1, wherein:
   said hydrogen source comprising hydrogen in liquid phase or gaseous phase stored in a one or more containers selected among: gas cylinders, and metal hydrides;
   where said hydrogen source comprises liquid or low-pressure hydrogen, said steam generator system further comprises a hydrogen vaporizer and a hydrogen pump respectively used to produce gaseous hydrogen at the necessary pressure for operation before it enters said hydrogen-oxygen handling unit;
   said hydrogen source comprises an industrial grade, with some impurities are accommodated depending on the final temperature, pressure, quality and usage of the steam generated by said steam generator system.

3. The steam generator system from claim 1, wherein:
said oxygen source having oxygen in gaseous phase or liquid phase stored under pressure in one or more containers such as a gas cylinders;
where said oxygen source comprises of liquid or gaseous oxygen, said steam generator system further comprises an oxygen vaporizer and an oxygen pump respectively, wherein;
said oxygen vaporizer and said oxygen pump are used to produce gaseous oxygen at the necessary pressure for operation before it enters said hydrogen-oxygen handling unit; and
a purity of said oxygen are of industrial grade with some impurities depending on the final temperature, pressure, quality and usage of the steam generated by said steam generator system.

4. The steam generator system from claim 1, wherein:
said nitrogen source having nitrogen in gaseous phase stored under pressure in gas cylinders, or other containers; and
said nitrogen source provides nitrogen under pressure to purge the hydrogen and oxygen conduit before and after operation of said steam generator system.

5. The steam generator system from claim 4, wherein:
said nitrogen source is replaced with an inert gas.

6. The steam generator system from claim 1, wherein:
said water source is de-mineralized water comprising added chemicals to prevent rusting in said steam generator system.

7. The steam generator system from claim 1, wherein:
said steam source comprises a steam for use in said cooling unit.

8. The steam generator system from claim 1, wherein:
said hydrogen-oxygen handling unit comprise a hydrogen mass flow controller, a hydrogen flame flash back arrestor, an oxygen mass flow controller, an oxygen flame flash back arrestor, a H2-O2 mixer;
said hydrogen mass flow controller is configured to receive said hydrogen source and regulating its flow;
said hydrogen flame flash back arrestor is configured to quench a flame during a flame/flash-back occurrence and preventing it from reaching said hydrogen source;
said oxygen mass flow controller receives said oxygen source and regulating its flow;
said oxygen flame flash back arrestor is configured to quench a flame during a flame/flash-back occurrence and preventing it from reaching said oxygen source; and
said H2-O2 mixer is configured to
  receive said hydrogen source from said hydrogen mass flow controller and said oxygen source from said oxygen mass flow controller,
  uniformly mix said hydrogen source and said oxygen source at stoichiometry into said premixed H2-O2, and
  send said premixed H2-O2 to said one or more H2-O2 steam generators.

9. The steam generator system from claim 1, wherein:
said one or more H2-O2 steam generators comprise a burner tip and a steam generation chamber;
said burner tip is configured to receive
  said premixed H2-O2 from said hydrogen-oxygen handling unit,
  said increased-pressure water from said cooling unit, and
  said cooling steam from said cooling unit; and said steam generation chamber is configured to combust said premixed H2-O2 and mix said cooling steam and/or said increased-pressure water to create said generated steam at a desired temperature and pressure.

10. The steam generator system from claim 9, wherein:
said steam generation chamber comprising a burner tip mounting frame, a liner, an inner pass, an outer pass, a cooling steam inlet, a steam injector ring, a cooling water inlet, a water spray nozzle, a liner steam vent, a steam exit vent, and an ignition unit;
said burner tip mounting frame is configured for mounting said burner tip and said ignition unit into said steam generation chamber;
said liner which divides the hollow interior of said steam generation chamber into two passes;
said inner pass at which the combustion of said premixed H2-O2 occurs and said increased-pressure water and/or a steam-water mist mixture are injected;
said outer pass at which the combustion product of said premixed H2-O2 combustion and the coolant (water or steam or both) mix to form said generated steam at desired temperature;
said cooling steam inlet is configured for receiving said cooling steam from said cooling unit;
said steam injector ring is configured for injecting said cooling steam;
said cooling water inlet is configured for receiving said increased-pressure water from said cooling unit;
said water spray nozzle is configured for injecting said increased-pressure water;
said liner steam vent is configured to allow a mixture of steam to pass from said inner pass to said outer pass;
said steam exit vent is configured to selectively vent said generated steam out of said steam generation chamber; and
said ignition unit configured to ignite said premixed H2-O2 at said inner pass.

11. The steam generator system from claim 9, wherein:
said steam generator system is configured with a size and number of a liner steam vent to optimize a flowrate of hydrogen, oxygen and coolant, as well as the rated operating pressure inside said steam generation chamber.

12. The steam generator system from claim 9, wherein:
a steam injector ring is configured to inject said cooling steam into an inner pass using a series of ports in a ring structure attached to a liner of said inner pass; and
the number of ring structures and ports in the ring structures are optimized for the flow rate and pressure of said cooling steam from said cooling unit.

13. The steam generator system from claim 9, wherein:
placement of a cooling steam inlet, a steam injector ring, a cooling water inlet, a water spray nozzle, a liner steam vent, and a steam exit vent to get maximum thermal efficiency with reduced pressure losses and hot spots depends on
the flowrate of said premixed H2-O2, said cooling steam, and said cooling steam, and
the rated maximum operating temperature and pressure of said generated steam.

14. The steam generator system from claim 9, wherein:
a liner comprises a heat conductor configured to distribute the heat over its surface area to avoid hot spots during the combustion process.

15. The steam generator system from claim 9, wherein:
said burner tip comprising a burner tip main body, a cooling steam inlet, a premixed H2-O2 inlet, an insulating medium, a premixed H2-O2 receiving chamber, a sintered plate, a premixed H2-O2 upper chamber, a one or more cooling steam chambers, a premixed H2-O2 injector array and a one or more steam injectors;

said burner tip main body is configured to hold the parts of said burner tip in place for safe and sustained operation;

said cooling steam inlet is configured for receiving said cooling steam from said cooling unit;

said premixed H2-O2 inlet is configured for receiving said premixed H2-O2 from said hydrogen-oxygen handling unit;

said insulating medium configured for preventing heat loss of said cooling steam and heat transfer between said cooling steam and said premixed H2-O2;

said premixed H2-O2 receiving chamber configured for receiving said premixed H2-O2 from said premixed H2-O2 inlet;

said sintered plate is configured to act as a flame/flash-back arrestor to prevent damage to said burner tip during flame/flash-back occurrence;

said premixed H2-O2 upper chamber is configured for receiving said premixed H2-O2 from said premixed H2-O2 receiving chamber, after passing through said sintered plate and stabilizing said premixed H2-O2 gas pressure, and before being injected into said steam generation chamber;

said one or more cooling steam chambers is configured for
receiving said cooling steam from said cooling steam inlet, and
stabilizing a steam pressure of said cooling steam before being injected into said steam generation chamber;

said premixed H2-O2 injector array is configured for injecting said premixed H2-O2 into said steam generation chamber for combustion; and said one or more steam injectors is configured for injecting said cooling steam into said steam generation chamber for cooling a liner on an inner pass.

16. The steam generator system from claim 15, wherein:
said insulating medium is liquid, solid or in gaseous phase, depending on the temperature of said cooling steam.

17. The steam generator system from claim 15, wherein:
said premixed H2-O2 receiving chamber contains a flow velocity equalizer medium to attain a favorable velocity and pressure for the combustion process depending on the inlet pressure and velocity of said premixed H2-O2 entering said premixed H2-O2 receiving chamber.

18. The steam generator system from claim 15, wherein:
said premixed H2-O2 injector array with injector size, arrangement and angle of inclination are optimized for the flowrate, velocity and pressure of said premixed H2-O2 at exit of said premixed H2-O2 injector array to enhance combustion without flashbacks at various loading conditions.

19. The steam generator system from claim 15, wherein:
said one or more steam injectors is inclined in such a way that it provides a steam film along said inner pass side of said liner of said steam generation chamber which acts as a coolant to prevent thermal meltdown or other damages due to thermal stress during said premixed H2-O2 combustion;

the number of said one or more steam injectors and angle of inclination is optimized for the flowrate, velocity and pressure of said cooling steam exiting through the injectors; and provided adequate amounts of said steam is not available or more cooling is required for the inner surface of said liner, said cooling steam inlet and said one or more steam injectors of said burner tip are configured to handle said increased-pressure water.

20. The steam generator system from claim 1, wherein:
said steam generator system is configured to operate without said water source which feeds said increased-pressure water into said cooling unit;
said cooling unit operates without a water flow controller, a high-pressure water pump and a steam-water mixer; and
a cooling water inlet and a water spray nozzle in a steam generation chamber are modified to accommodate said steam.

21. The steam generator system from claim 1, wherein:
said steam generator system is configured to operate without said steam source which feeds said cooling steam into said cooling unit;
said cooling unit operates without a steam flow controller and a steam-water mixer;
a cooling steam inlet, a one or more cooling steam chambers and a one or more steam injectors at a burner tip are configured to be modified to inject said increased-pressure water; and
said cooling steam inlet, a steam injector ring, at a steam generation chamber are configured to be modified to inject said increased-pressure water.

22. The steam generator system from claim 21, wherein:
said one or more H2-O2 steam generators are configured to create said generated steam; and
said steam generator system is configured to increase efficiency, provided an absence of said steam source in said steam generator system,
to direct a portion of said generated steam to said steam-water mixer in said cooling unit for reuse,
said portion of said generated steam is mixed with said increased-pressure water to form a steam-water mist mixture,
said steam-water mist mixture is fed into said cooling steam inlet of said burner tip and said steam generation chamber for cooling purposes.

23. The steam generator system from claim 1, wherein:
said steam source supplies a steam created in a method selected among: an industrial process, a bleed steam from a steam or gas turbine cycle, or a steam generated by waste heat recovery; and
a portion of said steam source is injecting into a steam-water mixer, where said high increased-pressure water is misted into said steam and then injected into said one or more H2-O2 steam generators.

24. A method of burning H2-O2 for creating a generated steam comprising the following steps:
receiving a hydrogen from a hydrogen source into a hydrogen-oxygen handling unit having a hydrogen mass flow controller, a H2 flame/flash back arrestor, an oxygen mass flow controller, an oxygen flame flash back arrestor and a H2-O2 mixer;
monitoring said hydrogen from said hydrogen source with said hydrogen mass flow controller for flow rate, temperature and pressure;

controlling desired flow rate of said hydrogen coming from said hydrogen source with said hydrogen mass flow controller of said hydrogen-oxygen handling unit;

further a hydrogen flame flash back arrestor is a safety device, helps in quenches the flame during a flame/flash-back occurrence in the hydrogen passage and preventing it from reaching said hydrogen source;

from said H2 flame/flash back arrestor, said hydrogen is feed into said H2-O2 mixer;

receiving an oxygen source into said hydrogen-oxygen handling unit;

monitoring said oxygen from said oxygen source with said oxygen mass flow controller for flow rate, temperature and pressure;

controlling desired flow rate of said oxygen coming from said oxygen source with said oxygen mass flow controller of said hydrogen-oxygen handling unit;

further said oxygen flame flash back arrestor is a safety device, helps in quenches the flame during a flame/flash-back occurrence in the oxygen passage and preventing it from reaching said oxygen source;

from said oxygen flame flash back arrestor, said oxygen is feed into said H2-O2 mixer;

said H2-O2 mixer, receives said hydrogen from said H2 flame/flash back arrestor and said oxygen from said oxygen flame flash back arrestor and mixes in a stoichiometric ratio and feeds it into a premixed H2-O2 inlet of a burner tip; and before and after operation of a steam generator system, nitrogen from a nitrogen source is used to purge said hydrogen passage and said oxygen passage to ensure safe operation and prevent flame/flash back.

25. The method of burning H2-O2 from claim 24, wherein:

delivering a premixed H2-O2 into said premixed H2-O2 inlet of said burner tip, wherein a steam generator comprises said burner tip, a steam generation chamber and an ignition unit, and said burner tip comprises said premixed H2-O2 inlet, an insulating medium, a premixed H2-O2 receiving chamber, a sintered plate and a premixed H2-O2 upper chamber;

said premixed H2-O2 passes into said premixed H2-O2 receiving chamber, and further pass through said sintered plate into said premixed H2-O2 upper chamber; and from which said premixed H2-O2 is injected in to said steam generation chamber through a premixed H2-O2 injector array.

26. The method of burning H2-O2 from claim 25, wherein:

providing a water and/or a steam from a cooling unit, wherein:

receiving a water from a water source into a water flow controller of said cooling unit;

receiving a steam from a steam source into a steam flow controller of said cooling unit;

regulating a flow rate of said water from said water source with said water flow controller;

regulating a flow rate of said steam from said steam source with said steam flow controller;

pressurizing said water into an increased-pressure water from said water source with a high-pressure water pump;

delivering a portion of said increased-pressure water into said steam generator from said high-pressure water pump;

delivering a portion of said steam from said steam source to said steam generator; and a portion of said increased-pressure water and a portion of said steam from said steam source enter a steam-water mixer, where they are mixed and sent to said steam generator as said steam.

27. The method of burning H2-O2 from claim 26, wherein:

said steam and said increased-pressure water are received at a cooling steam inlet and a cooling water inlet respectively of said steam generation chamber and are injected into an inner pass of said steam generation chamber by optimally placing a steam injector ring and a water spray nozzle in such a way that said steam and increased-pressure water are injected uniformly in to the combustion resultant stream.

28. The method of burning H2-O2 from claim 27, wherein:

the sprayed/injected coolant and the combustion resultant stream exits said inner pass through optimally placed a liner steam vent into an outer pass where it is mixes well and forms a uniformly mixed said steam and exits said steam generator system through a steam exit vent.

29. The method of burning H2-O2 from claim 26, wherein:

injecting a portion of said cooling steam into a one or more cooling steam inlets of said burner tip;

spraying a portion of said cooling steam out of a one or more steam injectors of said burner tip;

configuring said one or more steam injectors at an angle in such a way that it forms a steam film along the inner surface of a liner of said steam generation chamber;

cooling a portion of said steam generation chamber with said steam film and/or said cooling steam as a cooling medium for said liner; and a cooling steam inlet and steam injector of said burner tip are configured to handle said increased-pressure water and said steam if cooling is required for the inner surface of said liner.

30. The method of burning H2-O2 from claim 25, wherein:

igniting said premixed H2-O2 with ignited located on a front end of an inner pass of said steam generation chamber.

31. The method of burning H2-O2 from claim 24, wherein:

mixing said oxygen with said hydrogen in said H2-O2 mixer at stoichiometry ratio;

a premixed H2-O2 injector array with injector size, arrangement and angle of inclination are optimized for the flowrate, velocity and pressure of a premixed H2-O2 at exit of said premixed H2-O2 injector array to enhance combustion without flashbacks at various loading conditions;

a premixed H2-O2 receiving chamber can contain a flow velocity equalizer medium configured to adjust an inlet pressure and velocity of said premixed H2-O2 entering said premixed H2-O2 receiving chamber to attain a favorable velocity and pressure for the combustion process;

said flow velocity equalizer medium being selected from among small spherical balls or glass wool;

an insulating medium are liquid, solid or in gaseous phase, depending on the temperature of a cooling steam;

a premixed H2-O2 upper chamber receiving said premixed H2-O2 from said premixed H2-O2 receiving chamber after passing through said sintered plate and stabilizing said premixed H2-O2 gas pressure before being injected into a steam generation chamber; and a one or more cooling steam chambers configured for receiving a steam from a cooling steam inlet and stabilizing the steam pressure before being injected into said steam generation chamber.

32. The method of burning H2-O2 from claim 31, wherein:

a control unit receives input signals and data from various components of the system, processes it, and controls various instruments in the system.

* * * * *